United States Patent
Hase et al.

(10) Patent No.: US 10,936,980 B2
(45) Date of Patent: Mar. 2, 2021

(54) GRAPHICAL USER INTERFACE FOR ENTERPRISE PROJECT PORTFOLIO MANAGEMENT UTILIZING NORMALIZED PROJECT ATTRIBUTES MAPPED TO A COMMON FRAMEWORK

(71) Applicant: ServiceNow Inc., Santa Clara, CA (US)

(72) Inventors: Nitin Lahanu Hase, Hyderabad (IN); Pradeep Bansal, Santa Clara, CA (US); Sharath Chandra Lagisetty, Hyderabad (IN); Sunil Basavapura Nagarajappa, Hyderabad (IN); Yogesh Devatraj, Hyderabad (IN); Shankar Kattamanchi, Hyderabad (IN); Krishna Durgasi, Hyderabad (IN)

(73) Assignee: SERVICENOW, INC., Santa Clara, CA (US)

( * ) Notice: Subject to any disclaimer, the term of this patent is extended or adjusted under 35 U.S.C. 154(b) by 393 days.

(21) Appl. No.: 15/973,185

(22) Filed: May 7, 2018

(65) Prior Publication Data
US 2019/0340553 A1 Nov. 7, 2019

(51) Int. Cl.
*G06Q 10/06* (2012.01)
*H04L 29/08* (2006.01)

(52) U.S. Cl.
CPC ... *G06Q 10/06313* (2013.01); *H04L 67/1002* (2013.01)

(58) Field of Classification Search
CPC .............. H04L 67/1002; G06Q 10/06; G06Q 10/06313; G06Q 10/063; G06Q 10/0631; G06Q 10/063118; G06Q 40/06
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,039,654 B1 * | 5/2006 | Eder | G06Q 10/06 |
| 7,062,683 B2 | 6/2006 | Warpenburg | |
| 7,131,037 B1 | 10/2006 | LeFaive | |

(Continued)

OTHER PUBLICATIONS

Woff, Mario, Project and Project Portfolio Management SAP SAP, 2002 (Year: 2002).*

(Continued)

*Primary Examiner* — Scott L Jarrett
(74) *Attorney, Agent, or Firm* — Fletcher Yoder, P.C.

(57) ABSTRACT

Present embodiments are directed toward systems and methods for enhancing the organization and overall management of resource allocation items in one or more enterprise networks by normalizing corresponding allocation objects, filtering the allocation objects based on one or more attributes of the allocation objects, grouping the allocation objects in a client instance view viewable to an individual, and generating a variety of allocation objects in accordance with the one or more filter configuration inputs and the one or more grouping configuration, improving client instance customization of resource allocations.

20 Claims, 22 Drawing Sheets

(56) References Cited

U.S. PATENT DOCUMENTS

| | | | | |
|---|---|---|---|---|
| 7,170,864 | B2 | 1/2007 | Matharu | |
| 7,392,300 | B2 | 6/2008 | Anantharangachar | |
| 7,610,512 | B2 | 10/2009 | Gerber | |
| 7,613,623 | B2 * | 11/2009 | Nemecek | G06Q 10/063 705/7.16 |
| 7,617,073 | B2 | 11/2009 | Trinon | |
| 7,664,664 | B2 * | 2/2010 | King | G06Q 10/06 705/7.28 |
| 7,685,167 | B2 | 3/2010 | Mueller | |
| 7,689,628 | B2 | 3/2010 | Garg | |
| 7,716,353 | B2 | 5/2010 | Golovinsky | |
| 7,769,718 | B2 | 8/2010 | Murley | |
| 7,783,744 | B2 | 8/2010 | Garg | |
| 7,890,802 | B2 | 2/2011 | Gerber | |
| 7,925,981 | B2 | 4/2011 | Pourheidari | |
| 7,930,396 | B2 | 4/2011 | Trinon | |
| 7,933,927 | B2 | 4/2011 | Dee | |
| 7,945,860 | B2 | 5/2011 | Vambenepe | |
| 7,966,398 | B2 | 6/2011 | Wiles | |
| 7,991,632 | B1 * | 8/2011 | Morris | G06Q 10/0631 705/7.11 |
| 7,991,669 | B2 * | 8/2011 | Flaxer | G06Q 40/06 705/36 R |
| 8,051,164 | B2 | 11/2011 | Peuter | |
| 8,082,222 | B2 | 12/2011 | Rangarajan | |
| 8,151,261 | B2 | 4/2012 | Sirota | |
| 8,224,683 | B2 | 7/2012 | Manos | |
| 8,266,096 | B2 | 9/2012 | Navarrete | |
| 8,380,645 | B2 | 2/2013 | Kowalski | |
| 8,402,127 | B2 | 3/2013 | Solin | |
| 8,407,078 | B1 * | 3/2013 | Caputo | G06Q 10/06 705/7.27 |
| 8,457,928 | B2 | 6/2013 | Dang | |
| 8,478,569 | B2 | 7/2013 | Scarpelli | |
| 8,543,438 | B1 * | 9/2013 | Fleiss | G06Q 10/0631 705/7.13 |
| 8,549,036 | B2 * | 10/2013 | O'Connor | G06Q 10/06 707/776 |
| 8,554,750 | B2 | 10/2013 | Rangaranjan | |
| 8,566,745 | B2 * | 10/2013 | Bartolini | G06Q 40/00 715/810 |
| 8,583,465 | B1 * | 11/2013 | Isamat | G06Q 10/0631 705/7.12 |
| 8,612,408 | B2 | 12/2013 | Trinon | |
| 8,646,093 | B2 | 2/2014 | Myers | |
| 8,674,992 | B2 | 3/2014 | Poston | |
| 8,682,701 | B1 * | 3/2014 | Knauth | G06Q 10/06 705/7.11 |
| 8,689,241 | B2 | 4/2014 | Naik | |
| 8,743,121 | B2 | 6/2014 | De Peuter | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,887,133 | B2 | 11/2014 | Behnia | |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Apte | |
| 9,122,552 | B2 | 9/2015 | Whitney | |
| 9,137,115 | B2 | 9/2015 | Mayfield | |
| 9,239,857 | B2 | 1/2016 | Trinon | |
| 9,317,327 | B2 | 4/2016 | Apte | |
| 9,323,801 | B2 | 4/2016 | Morozov | |
| 9,363,252 | B2 | 6/2016 | Mueller | |
| 9,412,084 | B2 | 9/2016 | Kowalski | |
| 9,467,344 | B2 | 10/2016 | Gere | |
| 9,535,737 | B2 | 1/2017 | Joy | |
| 9,613,070 | B2 | 4/2017 | Kumar | |
| 9,645,833 | B2 | 5/2017 | Mueller | |
| 9,654,473 | B2 | 5/2017 | Mueller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,852,165 | B2 | 12/2017 | Morozov | |
| 10,002,203 | B2 | 6/2018 | George | |
| 10,362,041 | B2 * | 7/2019 | Das | H04L 63/105 |
| 2002/0055832 | A1 * | 5/2002 | Donelan | G06Q 10/06 703/22 |
| 2003/0135399 | A1 * | 7/2003 | Ahamparam | G06Q 10/0635 705/7.28 |
| 2003/0208429 | A1 * | 11/2003 | Bennett | G06Q 10/063 705/36 R |
| 2004/0254959 | A1 * | 12/2004 | Dierksen | G06Q 40/08 |
| 2005/0137920 | A1 * | 6/2005 | O'Connor | G06Q 10/06313 705/7.23 |
| 2005/0138074 | A1 * | 6/2005 | O'Connor | G06Q 10/06 |
| 2006/0129439 | A1 * | 6/2006 | Arlt | G06Q 40/06 705/7.23 |
| 2008/0033888 | A1 * | 2/2008 | Flaxer | G06Q 10/00 705/36 R |
| 2009/0119144 | A1 * | 5/2009 | Goyal | G06Q 10/06 705/7.12 |
| 2010/0011337 | A1 * | 1/2010 | Young | G06F 8/20 717/104 |
| 2010/0274621 | A1 * | 10/2010 | Diwakar | G06Q 50/188 705/80 |
| 2013/0018818 | A1 | 1/2013 | Yadav | |
| 2014/0089228 | A1 | 3/2014 | Silberman | |
| 2014/0304174 | A1 * | 10/2014 | Scott | G06Q 10/103 705/301 |
| 2018/0307580 | A1 * | 10/2018 | Potts | G06Q 10/06393 |
| 2019/0349273 | A1 * | 11/2019 | Rikovic Tabak | G06K 9/6215 |

OTHER PUBLICATIONS

Oracle Project Portfolio Analysis User Guide—Release 12 Oracle, Dec. 2006 (Year: 2006).*

Portfolio Project Management—Multi-Project Monitoring and Reporting Campana & Schott Group, 2003 (Year: 2003).*

Asa; "Investment Prioritization and Planning," IasaGlobal, Feb. 7, 2017, https://www.iasaglobal.org/itabok/capability . . . /inestment-prioritization-and-planning/ (13 pages).

* cited by examiner

FIG. 22

GRAPHICAL USER INTERFACE FOR ENTERPRISE PROJECT PORTFOLIO MANAGEMENT UTILIZING NORMALIZED PROJECT ATTRIBUTES MAPPED TO A COMMON FRAMEWORK

BACKGROUND

The present disclosure relates generally to managing the allocation of enterprise resources.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Users tasked with automating and/or efficiently managing resources and/or other organization-related functions (e.g., allocating resources to promote the growth of the organization) navigate ever increasing amounts of data to properly and efficiently perform their job functions. Certain job functions, such as allocating resources (e.g., funds, labor, time, etc.) are important to the growth of many organizations, including those using a cloud-based platform. With this in mind, the following embodiments are directed to improving the manner in which resources are managed within these organizations, as well as the manner in which various tools and elements are employed to enable efficient resource management, in order to provide an enhanced user experience, the coordination of which may be difficult to implement in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below. Present embodiments are directed toward a system for enhancing the organization and overall management of resource allocation items by normalizing corresponding allocation objects, filtering the allocation objects based on one or more attributes of the allocation objects, and grouping the allocation objects in a client instance view viewable to an individual. As such, the presently disclosed technique generally makes the generation of a variety of allocation objects in accordance with one or more filtering configuration inputs and one or more grouping configuration inputs to generate the allocation objects of interest to an individual.

BRIEF DESCRIPTION OF THE DRAWINGS

Various aspects of this disclosure may be better understood upon reading the following detailed description and upon reference to the drawings in which:

FIG. 22 is an embodiment of the customizable GUI of FIG. 6, enabling the customization of the created widgets of FIG. 21, in accordance with aspects of the present approach.

DETAILED DESCRIPTION OF SPECIFIC EMBODIMENTS

Figure 1:
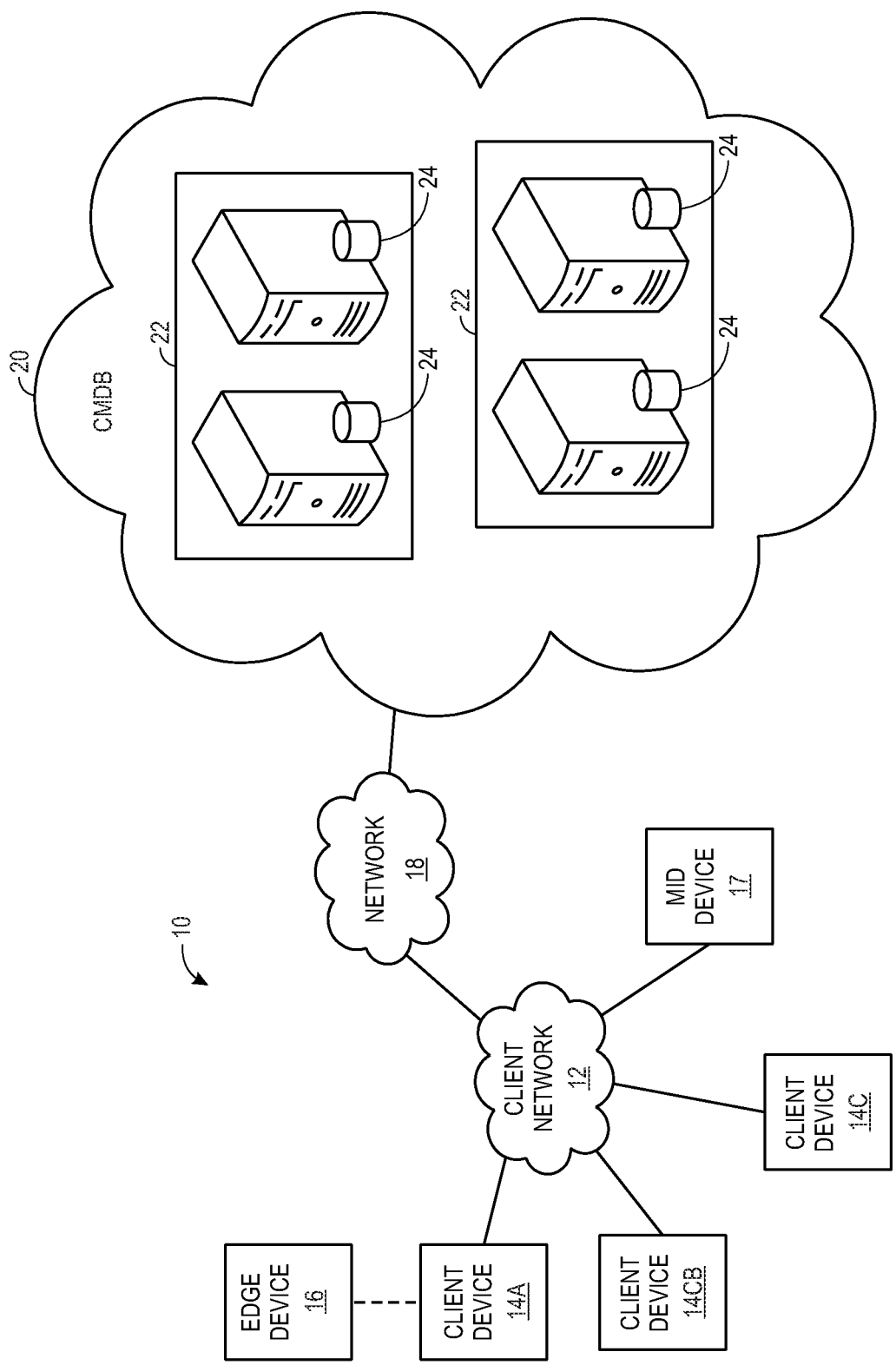
FIG. 1 is a block diagram of an embodiment of a cloud computing system, in accordance with aspects of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "allocation item" may be an allocation request (e.g., a demand for resources to accomplish an enterprise task), an allocation project (e.g., a project being executed with resources allocated for completion of an enterprise task), or any combination thereof. The term "allocation object" as used herein may correspond to an allocation item. The term "context" as used herein with respect to an allocation object may include substantially any information stored in a computer-based system (e.g., a cloud-based system) that is related to the allocation object. For example, allocation object context may include all suitable fields of the allocation object, the allocation item corresponding to the allocation object, as well as any field of a related allocation object and any field of any script associated with the menu item. By way of more specific example, the allocation object may be associated with one or more enterprise networks stored in a data server and correspond to an allocation item. The context of the allocation object may be associated with the instructions (e.g., code) for normalizing, grouping, or filtered, an allocation item that created, filtered, or grouped the allocation object, information regarding related allocation items, relationships to other allocation objects, and so forth.

Users, enterprises, and/or other organizations may utilize a computer-based system, such as a cloud-based system, to conduct activities or otherwise run an organization as discussed herein. Additionally, individuals may form a part of the organization and may each be in charge of managing certain tasks related to the operation of the organization of promoting the growth of the organization. For example, a first group of individuals may be responsible for managing resource allocation associated with certain allocation projects, and a second group of individuals may be responsible for managing resource allocation associated with allocation requests. The allocation projects and the allocation requests are hereinafter collectively referred to as "allocation items." In some instances, an individual may be a member of any number of teams associated with a corresponding allocation item.

Managing the overall allocation of resources may be an important feature associated with promoting the growth or facilitating operation of the organization for the first and second group. For example, it may be beneficial to determine whether there are leftover resources after the allocation projects have been accounted for to determine whether certain allocation requests can be funded with the leftover resources. As another example, the allocation items may include timeline data (e.g., deadlines, accomplished tasks, calendar events, etc.) and financial data (e.g., cost, rate of inflation, etc.), among other suitable data.

Present embodiments are directed toward a system for enhancing the organization and overall management of resource allocation items by normalizing corresponding allocation objects, filtering the allocation objects based on one or more attributes of the allocation objects, and grouping the allocation objects in a client instance view viewable to an individual. As such, the presently disclosed technique generally makes the generation of a variety of allocation objects in accordance with one or more filter configuration inputs and one or more grouping configuration inputs more intuitive, flexible, structured, and process driven, and provides an improved interface for managing enterprise resource allocation, enabling for client instance customization.

Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
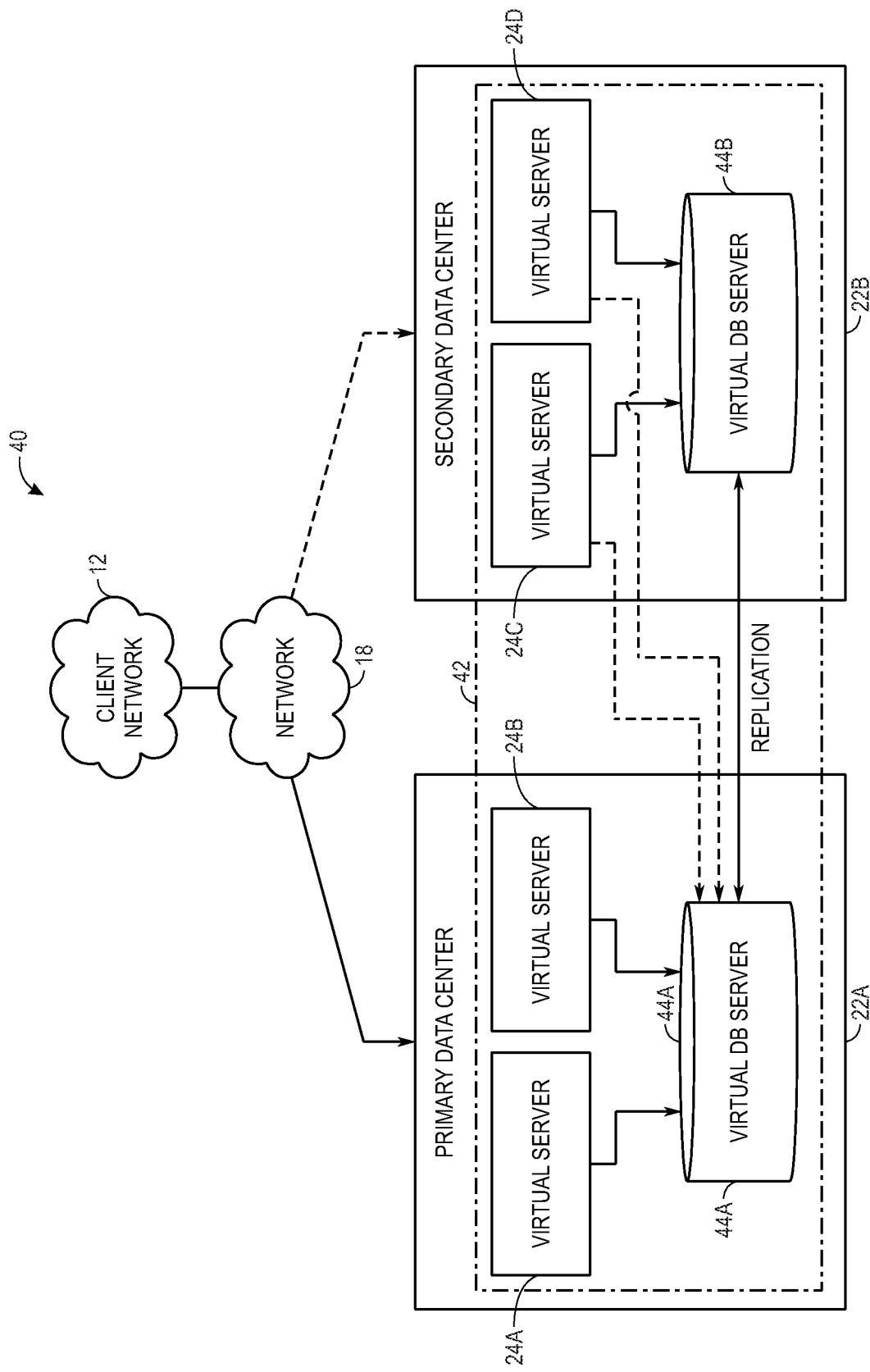
FIG. 2 is a block diagram of an embodiment of a multi-instance cloud architecture, in accordance with aspects of the present approach.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
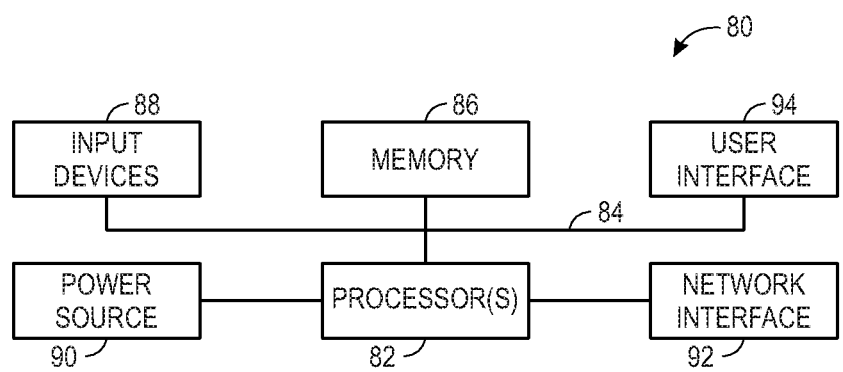
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

As mentioned, certain implementations of the present approach are directed to an embodiment of the cloud-based platform 20 having functionality that enables the client instance 42 to personalize the management of resource allocations for a given user. Using this functionality, the client instance 42 is able to generate allocation objects on a client instance view in accordance with one or more grouping configuration inputs and one or more filter configuration inputs, as discussed below. Additionally, client instance 42 includes a customizable graphical user interface (GUI) that is designed to present the client instance view. As discussed below, the customizable GUI may present the normalized allocation objects on a common client instance view (e.g., a common interface) and enable the filtering and grouping of the allocation objects for enhanced viewing and management of the allocation objects associated with the client instance 42.

Figure 4:
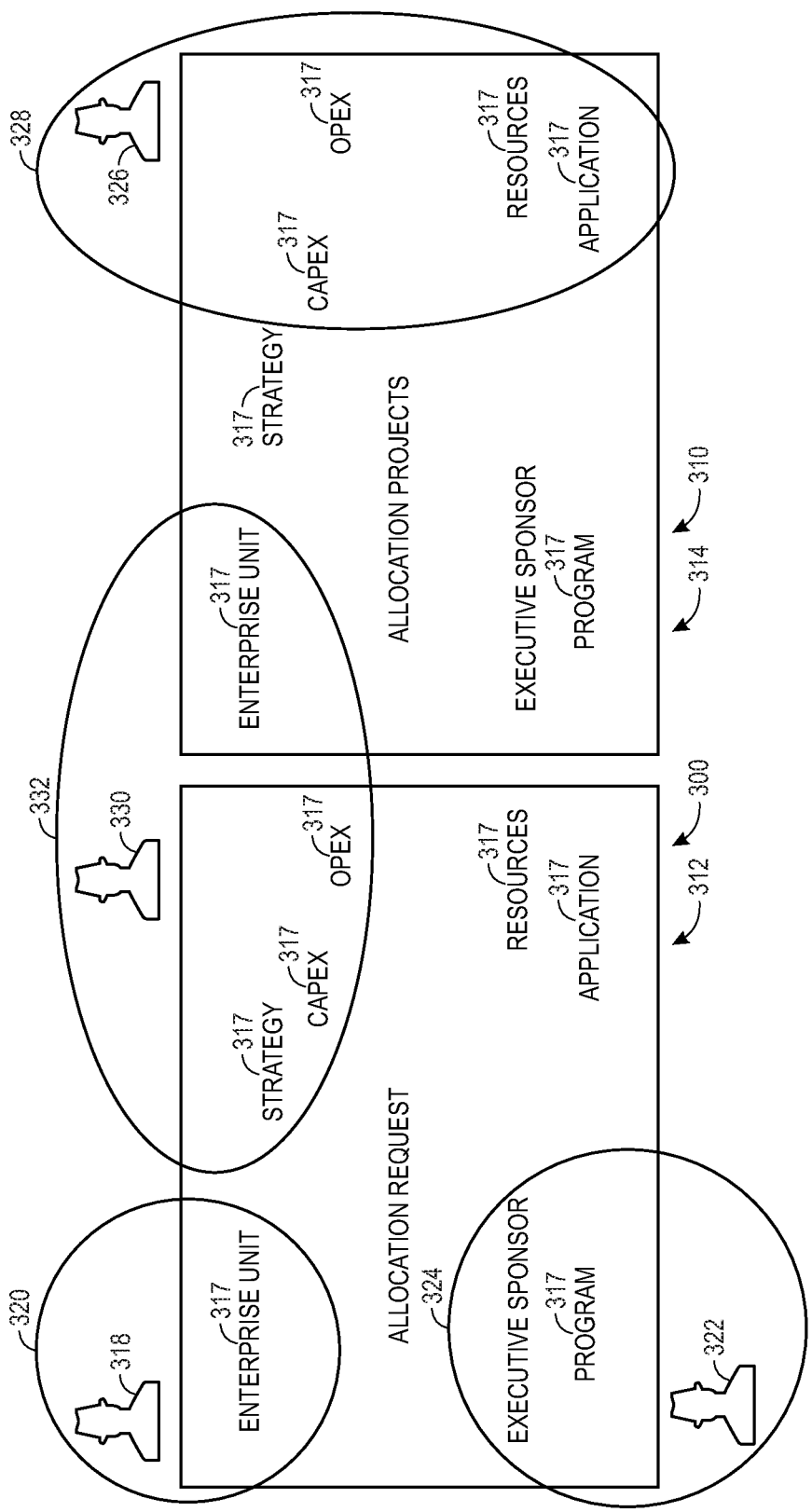
FIG. 4 is an embodiment of a variety of allocation items managed using a customer instance, as discussed in detail in FIG. 6, in accordance with aspects of the present approach.
Figure 6:
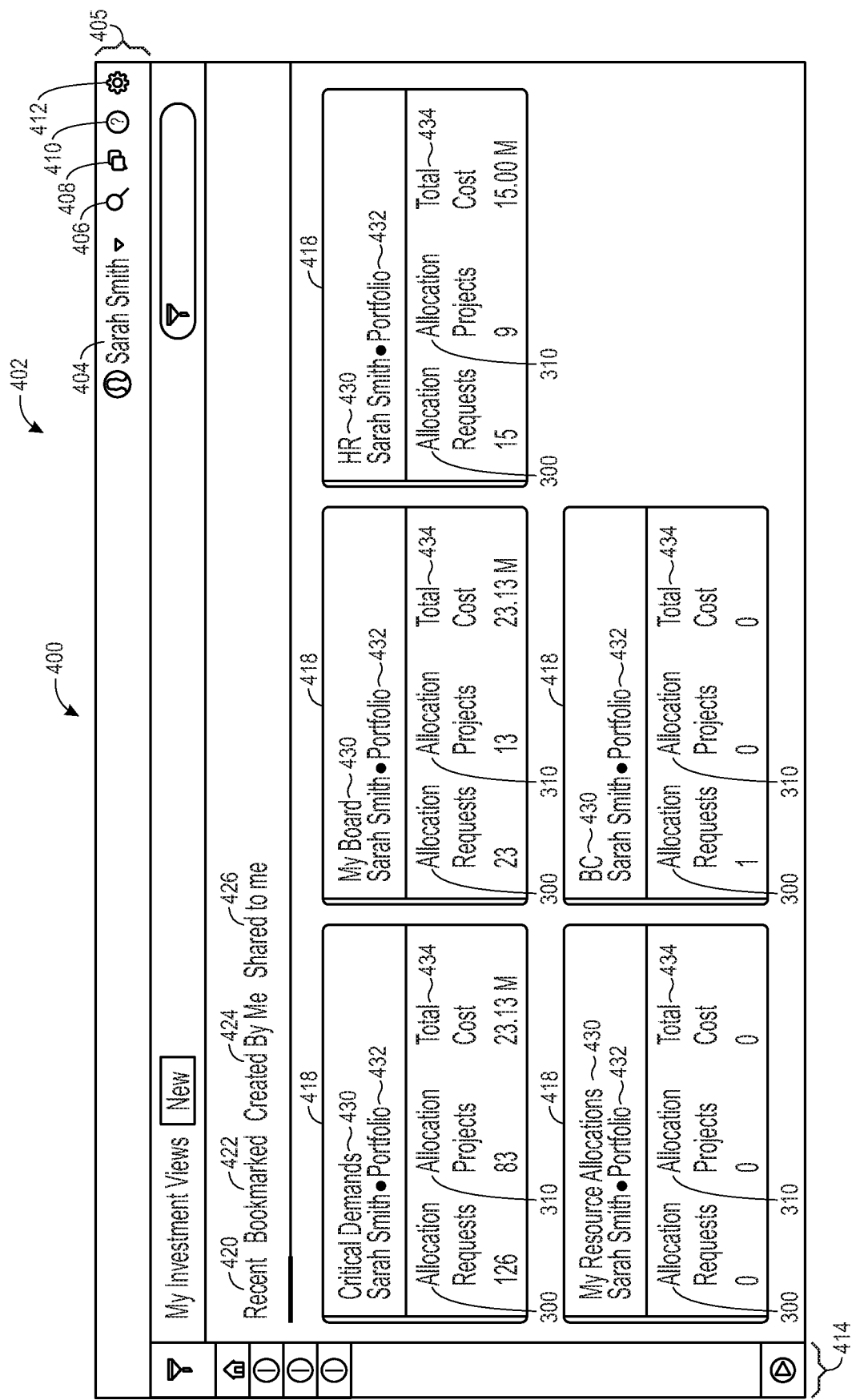
FIG. 6 is an embodiment of a customizable GUI, depicting recently created groups of allocation objects in a dashboard client instance view, in accordance with aspects of the present approach.

FIG. 4 is an embodiment of a variety of allocation requests 300 and allocation projects 310, which, as mentioned above, are collectively referred to as allocation items 311, managed using a customer instance as discussed in detail in FIG. 6, in accordance with aspects of the present approach. As mentioned above, the allocation requests 300 refers to allocation items 311 that are being planned and that may need to be funded to be executed, while the allocation projects 310 refers to allocation items 311 that have already been planned and/or are being executed. In some embodiments, the allocation items 311 may include a timeline data and financial data associated with accomplishing the allocation project 310.

In the illustrated embodiment, the allocation requests 300 and the allocation projects 310 may be presented to an individual as a variety of first objects 312 and a variety of second objects 314, respectively. The first objects 312 and the second objects 314 are collectively referred to as the "allocation objects" 315. In some embodiments, the allocation objects 315 may be managed in the client instance as allocation objects 315 using a client instance enabling management via a customizable GUI. The techniques described herein provide methods for normalizing attributes 317 associated with the allocation requests 300 and the allocation projects 310 to present the allocation items 311 as first objects 312 and/or the second objects 314 on the client instance view. In the illustrated embodiment, the first objects 312 and the second objects 314 may each include attributes 317, such as an attribute 317 indicative of an enterprise unit (e.g., type of enterprise affected, the division of the enterprise affect, etc.), an attribute 317 indicative of an executive sponsor program (e.g., designating priority for the allocation items, designating allocation objects flagged as important by the chief executive officer [CEO], etc.), an attribute 317 indicative of resource usage (e.g., labor requirements, infrastructure available, etc.), an attribute 317 indicative of applications (e.g., long term effects, short term effects, etc.), an attribute 317 indicative of a strategy (e.g., end goal, target audience, etc.), an attribute 317 indicative of capital expenses (capex) (e.g., computer equipment, furniture, software, vehicles, etc.), an attribute 317 indicative of operating expenses (opex) (e.g., license fees, attorney fees, utilities, repairs, insurance, etc.), just to name a few examples.

Furthermore, in the illustrated embodiment, a first individual 318 may be responsible for managing a first portion 320 of the allocation items 311, a second individual 322 may responsible for managing a second portion 324 of the allocation items 311, a third individual 326 may be responsible for managing a third portion 328 of the allocation items 311, and a fourth individual 330 may be responsible for managing a fourth portion 332 of the allocation items 311. For example, in some instances, only the allocation objects corresponding to the first portion 320 of the allocation items 311 may be of interest to the first individual 318, such that the first individual 318 may only want to be presented with those allocation objects on the customizable GUI described herein. It should be noted, the first, second, third or fourth portion 320, 324, 328, 332 may each be associated with any suitable number of allocation items 311.

Further, using the techniques described herein, the individuals may more efficiently manage the allocation objects 315. Specifically, the customizable GUI described herein may more effectively enable an individual to compare and manage those allocation objects 315 in a common framework (e.g., a common window). In some embodiments, the customizable GUI may normalize attributes 317 associated with the allocation objects 315 of the allocation requests 300, attributes 317 associated with the allocation objects 315 of the allocation projects 310, and the like. The normalized attributes 317 associated with the allocation objects 315 may then be presented in a common framework on the customizable GUI. The normalized attributes 317 may then be filtered based on one or more filter configuration inputs satisfying a filtering criteria, grouped based on a user grouping criteria, or any combination thereof, as discussed in detail below. The customizable GUI may enable further customization based on user preference.

Figure 5:
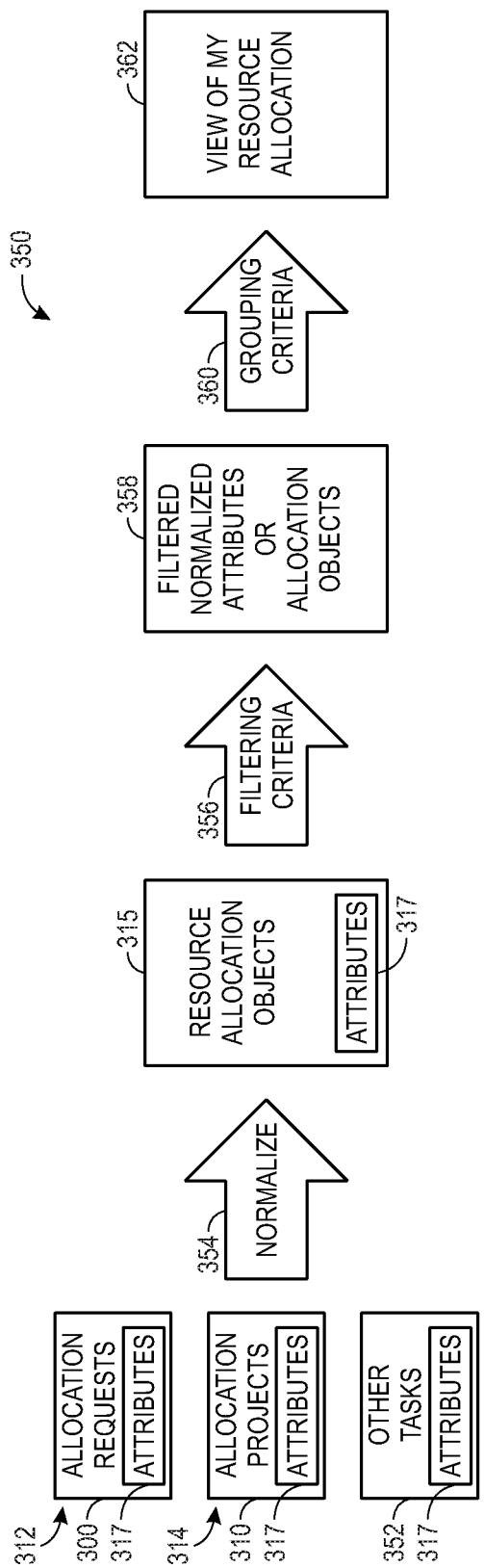
FIG. 5 is an embodiment of a process flow diagram of a method for generating allocation objects on a customizable GUI discussed in detail in FIG. 6, in accordance with aspects of the present approach.

FIG. 5 is an embodiment of a process flow diagram 350 of a method for generating certain allocation objects 315 and their corresponding attributes 317 on a customizable GUI discussed in detail in FIG. 6, in accordance with aspects of the present approach. As mentioned above, the steps of the process flow diagram 350 may be stored as code in one or more non-transitory mediums (e.g., memories of a data server storing instructions). The instructions may be executed by one or more hardware processors (e.g., of an application server), such that the one or more hardware processors may execute the code to perform the process flow diagram 350. In the illustrated embodiment, the one or more processors may identify a variety of allocation objects 315 associated with one or more enterprise networks stored within the data server. For example, the allocation objects 315 may include be a first object 312 corresponding to the allocation request 300, a second object 314 corresponding to the allocation project 310, and other objects corresponding to other tasks 352, just to name a few. In some embodiments, the identification of the allocation objects 315 (e.g., the first object 312, the second object 314, etc.) may be restricted based on an authority level of the individual. For example, an individual having a job title of analyst may be given less access than another individual having a job title of a C level executive, which may be given less access than yet another individual having a job title of a Chief Information Officer (CIO) of the organization. As such, when the CIO accesses the customizable GUI (e.g., provides login credentials, such as a username and password), the processor may identify different allocation objects 315 to present to the CIO than those identified to present to the C level executive, for example.

In some embodiments, the one or more processors may normalize (process block 354) the attributes corresponding to each allocation objects 315 onto a common framework to enable comparison of the data. For example, the processor may normalize a first attribute of the first object 312 and a second attribute of the second object 314 to enable comparisons with the first normalized attribute and the second normalized attribute on the client instance view. The client instance view may include a unified window presented on the customizable GUI to the individual. In some embodiments, normalizing (process block 354) the attributes 317 may include presenting the allocation objects 315 and attributes 317 with similar characteristics (e.g., similar font size, font type, font color, etc.), for example, to enhance the legibility and understanding of the content presented via the client instance view.

Furthermore, the one or more processors may receive a filtering criteria 356 based on one or more filter configuration inputs to filter the normalized attributes or the allocation objects 315. In some embodiments, after the individual is presented with the normalized attributes associated with the allocation objects 315, the individual may submit one or more filter configuration inputs, whereby the one or more processors filters the normalized attributes and the allocation objects 315 according to the one or more filter configuration inputs. Furthermore, the processor may aggregate the normalized attributes with other filtered attributes of the allocation objects to present the filtered normalized attributes 358, for example, on a respective column, and the associated allocation objects 315 on a respective row. For example, the customizable GUI may include selectable arrows for expanding the normalized attributes to include more or less data, based on the one or more filter configuration inputs. The processor may also group the allocations objects 315 based on one or more grouping configuration input. In other words, the one or more processors may group the allocation request and the allocation projects based on the on or more grouping configuration input.

FIG. 6 is an embodiment of the customizable GUI 400, depicting recently created groups of allocation objects 315 in a dashboard client instance view 402. As mentioned above, one or more processors may instruct the customizable GUI 400 to present the client instance view presented in this illustrated embodiment. In the illustrated embodiment, an individual 404 (e.g., "Sarah Smith" in this example) may be logged into the client instance 42. In some instances, the individual 404 may be required to provide login credentials (e.g., a password) to access the client instance 42. The dashboard client instance view 402 may include a toolbar with a variety of selectable features.

For example, the toolbar 405 may include a search option 406, such that the logged in individual 404, may search for certain characters (e.g., text) on the dashboard client instance view 402. Additionally, the toolbar 405 may include selectable features to enable the individual 404 to initiate an instant message (IM) 408, for example, with another individual; to enable the individual 404 to access a frequently asked (FAQs) tab 410, for example, to receive assistance in navigating the customizable GUI 400; and to enable the individual 404 to access system preferences 412 to allow the individual 404 may edit certain aspects of their profile (e.g., contact information, password, etc.). Although in the depicted embodiment, the toolbar 405 is positioned at the top of the customizable GUI 400, it should be noted that the toolbar 405 and any of its selectable features may be positioned at any suitable location on the client instance view (e.g., at the middle, at the bottom, at a corner). Furthermore, additional selectable features may be included in the toolbar 405, and certain selectable features discussed above may be omitted from the client instance view. In addition or alternatively, a side navigation panel 414 may be expanded to view more selectable features as discussed below.

Furthermore, the dashboard client instance view 402 may be presented to the individual 404 after the individual 404 logs into the customizable GUI 400. The dashboard client instance view 402 may include selectable options for selecting a group 418 of allocation items 311 that are recent 420, groups 418 of allocation objects 315 that were bookmarked 422, groups 418 of allocation objects 315 that were "created by me" 424 (e.g., created by the individual 404), and groups 418 of allocation objects 315 that were "shared to me" 426 (e.g., shared to the individual 404). In the illustrated embodiment, the selectable option for the groups 418 of allocation objects 315 that are recent 420 is selected, such that the groups 418 of allocation objects 315 that were recently viewed or edited are presented to the individual 404. In the illustrated embodiment, five groups 418 of allocation objects 315 are presented. In the illustrated embodiment, each of the groups 418 of allocation objects 315 include summary information associated with the corresponding allocation item.

In particular, the presented groups 418 may each include summary information, such as a group name 430 (e.g., "Critical Allocation Requests," "My Board," "HR," "My Resource Allocations," "BC"), an administrator name 432 (e.g., "Sarah Smith) of the creator or administrator of the group 418, a number of allocation requests 300, a number of allocation projects 310, a total cost 434 associated with completing allocation objects of the group 418, or any combination thereof. In some embodiments, any of the aforementioned summary information may be omitted or customized.

Figure 7:
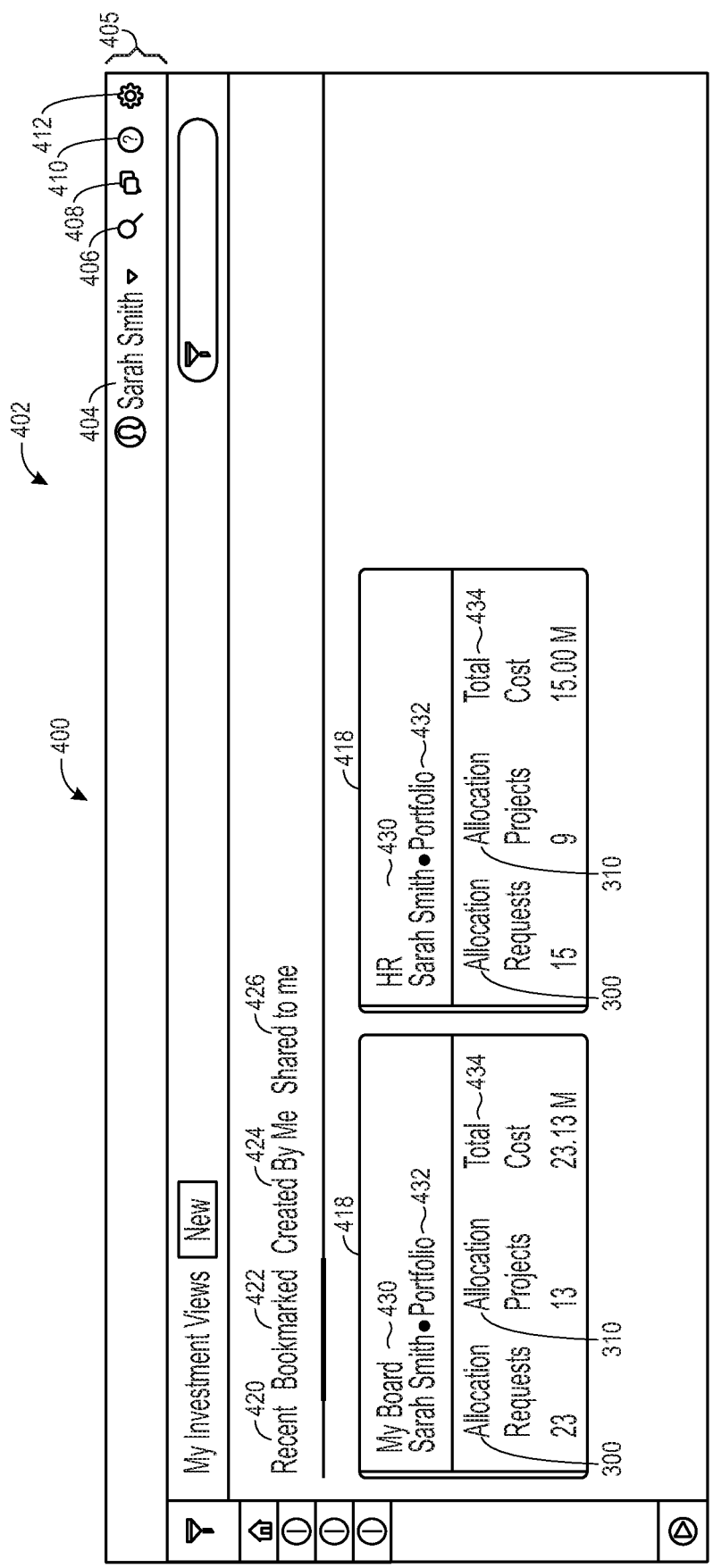
FIG. 7 is an embodiment of the customizable GUI of FIG. 6, depicting bookmarked groups of allocation objects in the dashboard client instance view of FIG. 6, in accordance with aspects of the present approach.

FIG. 7 is an embodiment of the customizable GUI 400 of FIG. 6, aggregating bookmarked groups of allocation items in the dashboard client instance view 402 of FIG. 6, in accordance with aspects of the present approach. In transitioning from the embodiment of FIG. 6, the one or more processors may receive a selection to view the bookmarked 422 groups 418. In the illustrated embodiment, the selectable option for the groups 418 of allocation items 311 that are bookmarked 422 is selected, such that the groups 418 of allocation items 311 that were bookmarked by the individual 404 are generated in the dashboard client instance view 402. In the illustrated embodiment, two groups 418 (e.g., "My Board" and "HR") of allocation items 311 are presented. In the illustrated embodiment, each of the groups 418 include summary information associated with the allocation item 311, as described above. The summary information may include any suitable information associated with the group 418, as described above. For example, in the illustrated embodiment, the summary information includes the group name 430, the administrator name 432, the number of allocation requests 300, the number of allocation projects 310, and the total cost 434 associated with undertaking the group 418 of allocation items 311, among other summary information.

Figure 8:
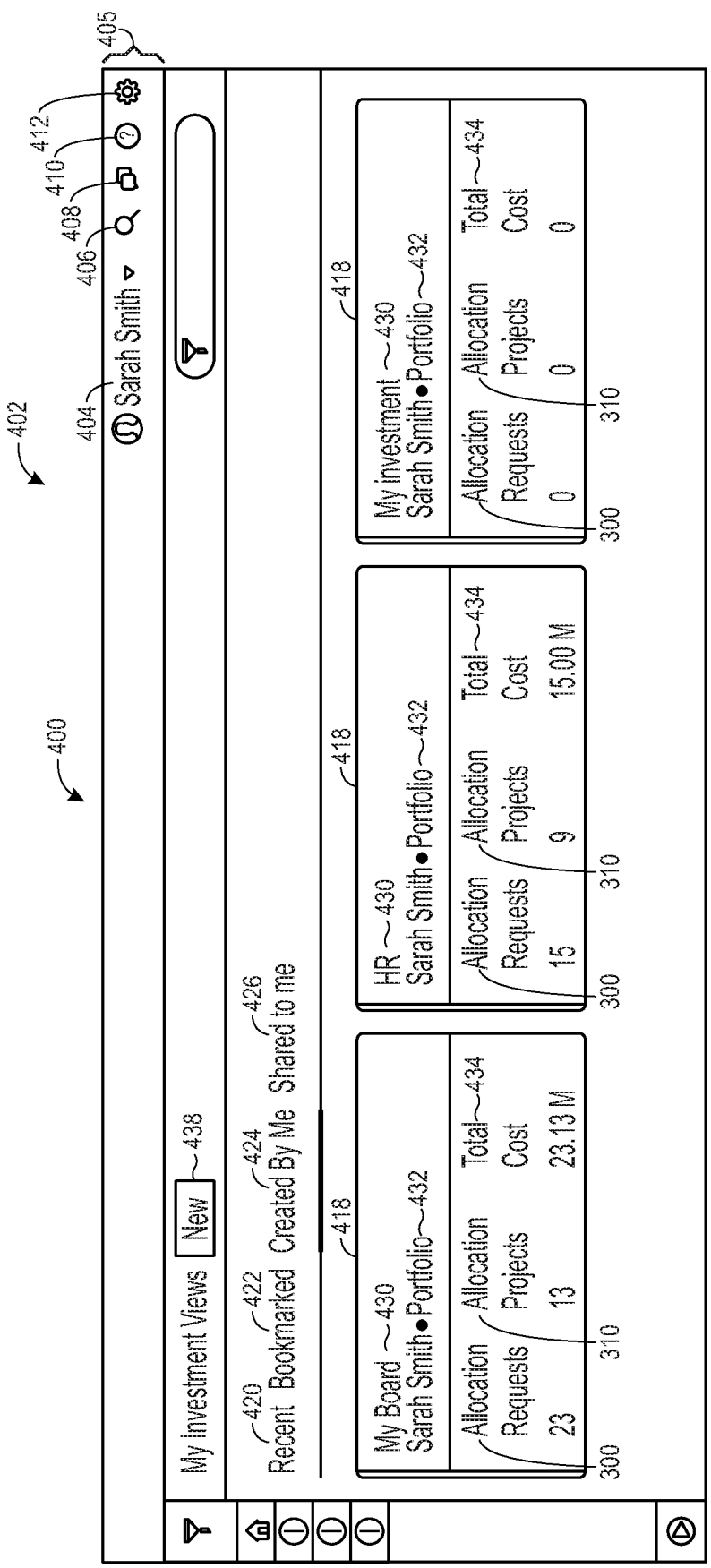
FIG. 8 is an embodiment of the customizable GUI of FIG. 6, depicting "created by me" groups of allocation objects in the dashboard client instance view of FIG. 6, in accordance with aspects of the present approach.

FIG. 8 is an embodiment of the customizable GUI 400 of FIG. 6, depicting "created by me" 424 groups 418 of allocation items 311 in the dashboard client instance view 402 of FIG. 6, in accordance with aspects of the present approach. In transitioning from the illustrated embodiment of FIG. 7, the one or more processors may receive a selection to view the "created by me" 424 groups 418. In the illustrated embodiment, the selectable option "created by me" 424 groups 418 is selected, such that the groups 418 of allocation objects 315 that were created by the individual 404 (e.g., "created by me" 424 groups 418) are aggregated. In the illustrated embodiment, three groups 418 (e.g., "My Board," "HR," and "My Investment") are presented. In the illustrated embodiment, each of the groups 418 include summary information associated with the allocation objects 315, as described above.

It should be noted that while navigating the dashboard client instance view 402, the customizable GUI 400 enables the individual 404 to select a new option 438 to create a new group 418. In some embodiments, the new option 438, when selected may cause a fillable window to pop-up on the customizable GUI 400. In some embodiments, after the fillable window is completed, the new group 418 may be shown when the "created by me" 424 selectable option is selected. In some embodiments, when the new option 438 is selected, the customizable GUI 400 enables the user to create a new allocation object 315 associated with a corresponding allocation item. The newly created allocation object 315 may be associated with an existing group 418. As such, the one or more grouping configuration inputs may be submitted by the individual upon creation of the allocation object.

Figure 9:
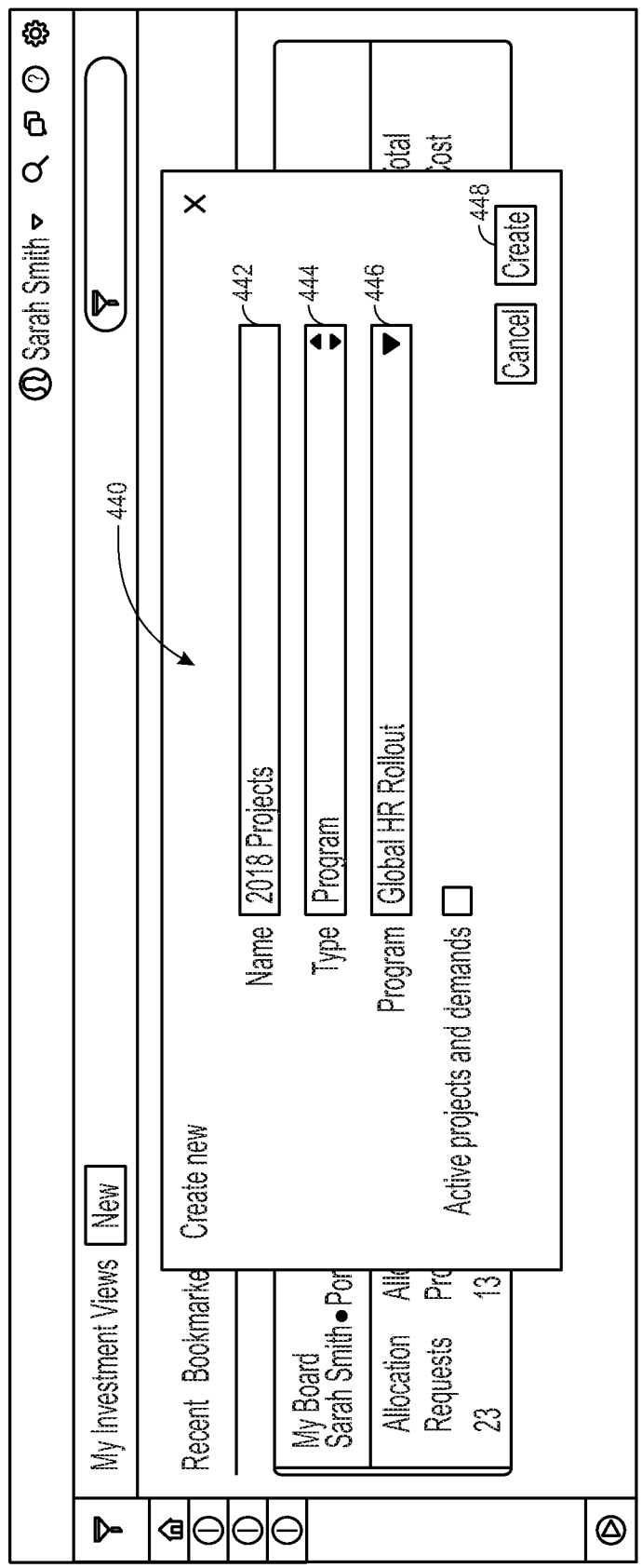
FIG. 9 is an embodiment of a window enabling the creation of a new group or allocation object, in accordance with aspects of the present approach.

In more detail, FIG. 9 is an embodiment of a window 440 enabling the creation of a new group 418 and/or a new allocation object 315, in accordance with aspects of the present approach. In the illustrated embodiment, the window 440 may receive a first user input 442 specifying the name of the newly created group 418 or allocation object 315. The window 440 may receive input characters (e.g., text) specifying the name of the newly created group 418 or allocation object 315. Alternatively, in some embodiments, the first user input 442 may include a drop-down menu with automatically generated names that may be selected.

In the illustrated embodiment, the window 440 may receive a second user input 444 to further specify whether the first user input 442 corresponds to a group 418 or an allocation item 311. For example, the second user input 444 may include a drop down menu with selectable options, such as "Program" to specify that the newly created allocation object corresponds to an allocation project 310, "Allocation request" to specify that the newly created allocation object is associated with an allocation request 300, or "Portfolio" to specify that the a group 418 is created, among other suitable selectable options. In some instances, the customizable GUI 400 enables character inputs (e.g., text) to the second user input 444. In some embodiments, the selectable options of the third user inputs 446 may be based on the second user input 444.

In the illustrated embodiment, the window 440 may receive a third user input 446 to further specify details regarding the first and second user inputs 442, 444 and may be based on the specified second user input 444. For example, when the second user input 444 specifies "Allocation request" (e.g., allocation request 300) or "Program" (e.g., allocation project 310), as mentioned above, the third user input 446 may include a drop-down menu of existing groups 418, which the add the newly created allocation object 315 may be added to. In some instances, the third user input 446 may include Boolean logic for specifying groups to which the newly created allocation request 300 or allocation project 310 may be added to. As another example, when the second user input 444 specifies "Program", as mentioned above, the third user input 446 may include a drop-down menu or text box for further specifying the type of group (e.g., Global HR Rollout).

Furthermore, a checkbox for specifying whether the newly created allocation object or group will be associated with allocation projects 310 and allocation requests 300 may be presented on the window 440. In some embodiments, selecting a create option 448 may cause the newly created allocation object or group to be associated with the individual 404. In some embodiments, selecting a create option 448 may cause the customizable GUI to display the newly created group on the "created by me" 424 groups 418. It should be noted that creating new allocation object 315 or groups 418 may be restricted to certain individuals having a certain authority level (e.g., project managers, executives, etc.).

Figure 10:
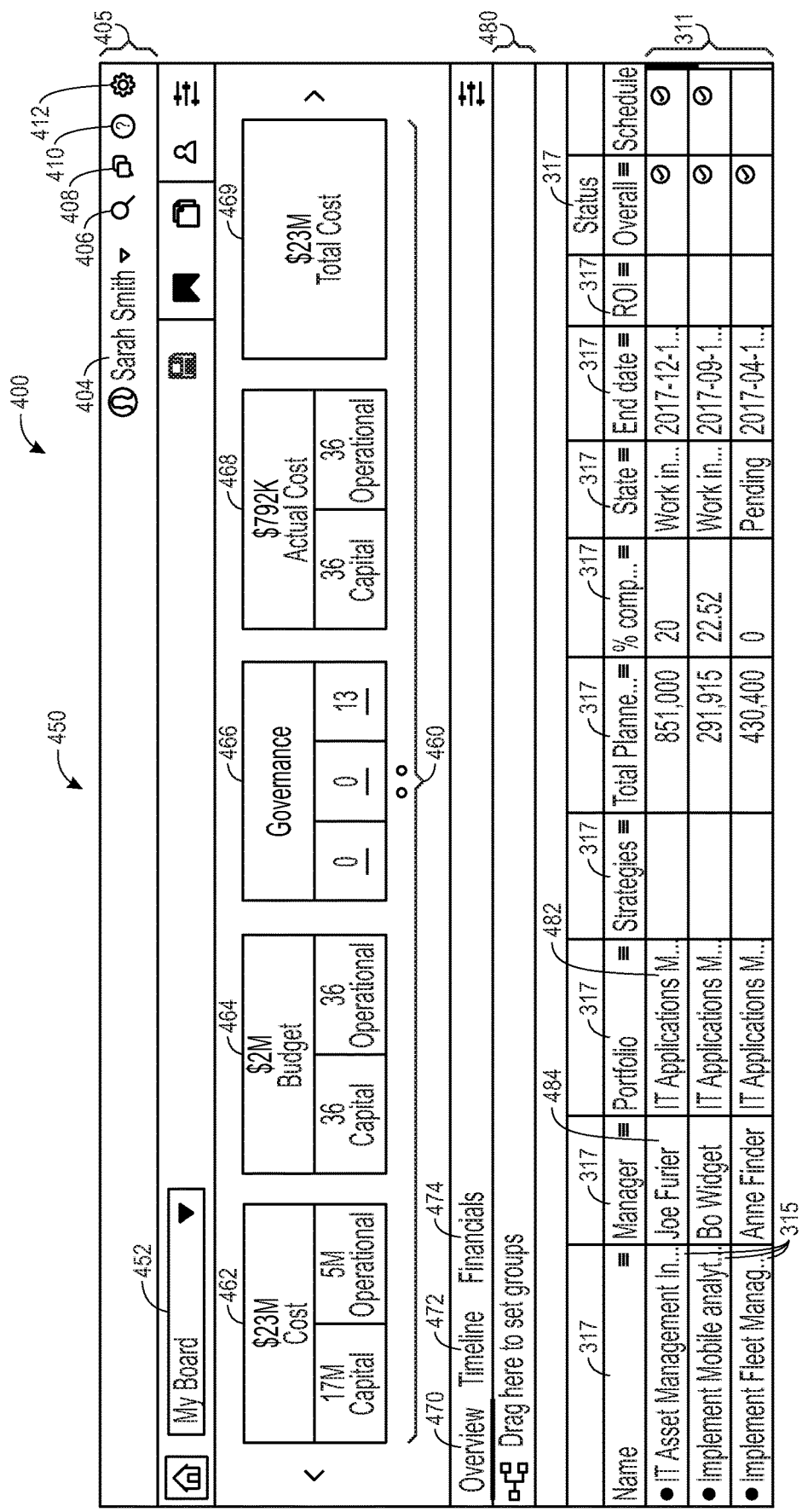
FIG. 10 is an embodiment of the customizable GUI of FIG. 6, depicting an overview of a group of allocation objects in a detailed client instance view, in accordance with aspects of the present approach.

FIG. 10 is an embodiment of the customizable GUI 400 of FIG. 6, depicting a detailed client instance view 450 of a group 418 of allocation objects 315, in accordance with aspects of the present approach. In the illustrated embodiment, the detailed client instance view 450 is presented via the customizable GUI 400 based on instructions executed by the one or more processors and includes data associated with the "My Board" group 452. The "My Board" group 452 may be presented via the customizable GUI after receipt of a selection (e.g., clicking on) the "My Board" group 452 from the dashboard client instance view 402 illustrated in FIG. 6. In some embodiments, selection of any of the groups 418 in the dashboard client instance view 402 of FIG. 6 may cause the customizable GUI 400 to transition from the dashboard client instance view 402 to the detailed client instance view 450 corresponding to the selected group 418. In the illustrated embodiment, the toolbar 405 and the side navigation panel 414 have been omitted to facilitate discussion. However, it should be noted that in some embodiments, the toolbar 405 and the side navigation panel 414 may be presented by the customizable GUI 400 when the customizable GUI 400 presents the detailed client instance view 450.

In the illustrated embodiment, the detailed client instance view 450 includes six widgets 460 (e.g., small applications that can be installed and executed within a browser page or instance GUI and that typically have limited, defined functionality). In the illustrated embodiment, the detailed client instance view 450 includes a first widget 462 indicative of the total cost (e.g., $23 M) of the allocation items 311 of the "My Board" group 452. The first widget 462 may include additional data, such as the capital expenses, the operational expenses, and the like. In the illustrated embodiment, the detailed client instance view 450 also includes a second widget 464 indicative of the total budget (e.g., $2 M) allocated to the allocation items 311 of the "My Board" group 452. The second widget 464 may include additional data, such as the capital budget, the operational budget, and the like. In the illustrated embodiment, the detailed client instance view 450 includes a third widget 466 indicative of the governance of the allocation items 311 of the "My Board" group 452. The third widget 466 may include additional data, such as governance data. In the illustrated embodiment, the detailed client instance view 450 includes a fourth widget 468 indicative of the actual cost (e.g., $792K) of the allocation items 311 associated with the "My Board" group 452. The fourth widget 468 may include additional data, such as the number of allocation items 311 associated with the actual capital expenses, the number of allocation items 311 associated with the operational expenses, and the like. In the illustrated embodiment, the detailed client instance view 450 includes a fifth widget 469 indicative of the total cost (e.g., $23 M) associated with the "My Board" group 452.

The detailed client instance view 450 may include any suitable number of widgets 460 associated with the group 418 (e.g., the "My Board" group 452). The customizable GUI 400 may enable access to additional widgets after selection of an arrow or scroll bar. The selection of the arrow or the scroll bar may enable navigation to additional widgets not aggregated on the detailed client instance view 450 (e.g., due to space constraints). It should be noted that customizable GUI 400 may enable the individual 404 to add additional widgets 460 or remove certain widgets 460. In some embodiments, the customizable GUI 400 may enable for the creation of widgets 460, as described in detail below.

In the illustrated embodiment, the overview tab 470 is selected to present the details depicted in FIG. 10. The customizable GUI 400 may also enable the selection of the timeline tab 472 and the financials tab 474 to present respective data. However, in some embodiments, the widgets 460 are presented in the detailed client instance view 450 when the overview tab 470, the timeline tab 472, or the financials tab 474 is selected.

The overview tab 470, when selected, may cause the customizable GUI 400 to present data associated with the allocation objects 315 of the selected group 418. Furthermore, the allocation objects 315 may present attributes 317 associated with the allocation objects 315. For example, the customizable GUI 400 may present attributes 317, such as the name (e.g., "Name"), the managing person (e.g., "Manager"), the portfolio (e.g., "Portfolio"), the strategies (e.g., "Strategies"), the total planned budget (e.g., "Total Planned Budget"), the percent completion (e.g., "% Completion), the state of progress (e.g., "State"), the end date or deadline (e.g., "End Date"), among other suitable information associated with each of the allocation objects. In the illustrated embodiment, the allocation objects 315 are presented on the rows and the attributes 317 are presented on the columns, such that the intersection of the rows and column, hereinafter referred to as a "cell," includes the attribute 317 corresponding to the allocation object 315 of the column. For example, a first cell 482 includes the "Portfolio" (e.g., attribute) associated with the allocation object "IT Asset Management," such that the first cell 482 specifies "IT Applications Modernization." As an additional example, the second cell 484 includes the "Manager" (e.g., attribute 317) associated with the allocation object 315, "IT Asset Management," such that the second cell 484 specifies "Joe Furler." It should be noted that, in some embodiments, the allocation objects 315 may be presented on the columns, and the attributes may be presented on the rows.

In the illustrated embodiment, the customizable GUI 400 includes a prompt for receiving grouping configuration inputs 480. As described in detail below, the customizable GUI 400 may enable specific cell to be selectably dragged into the prompt for receiving grouping configuration inputs

480. In the illustrated embodiment, the prompt for receiving grouping configuration inputs 480 includes a brief description to facilitate identification of the prompt. For example, the prompt for receiving grouping configuration inputs 480 may include text stating (e.g., "Drag here to set groups.")

Figure 11:
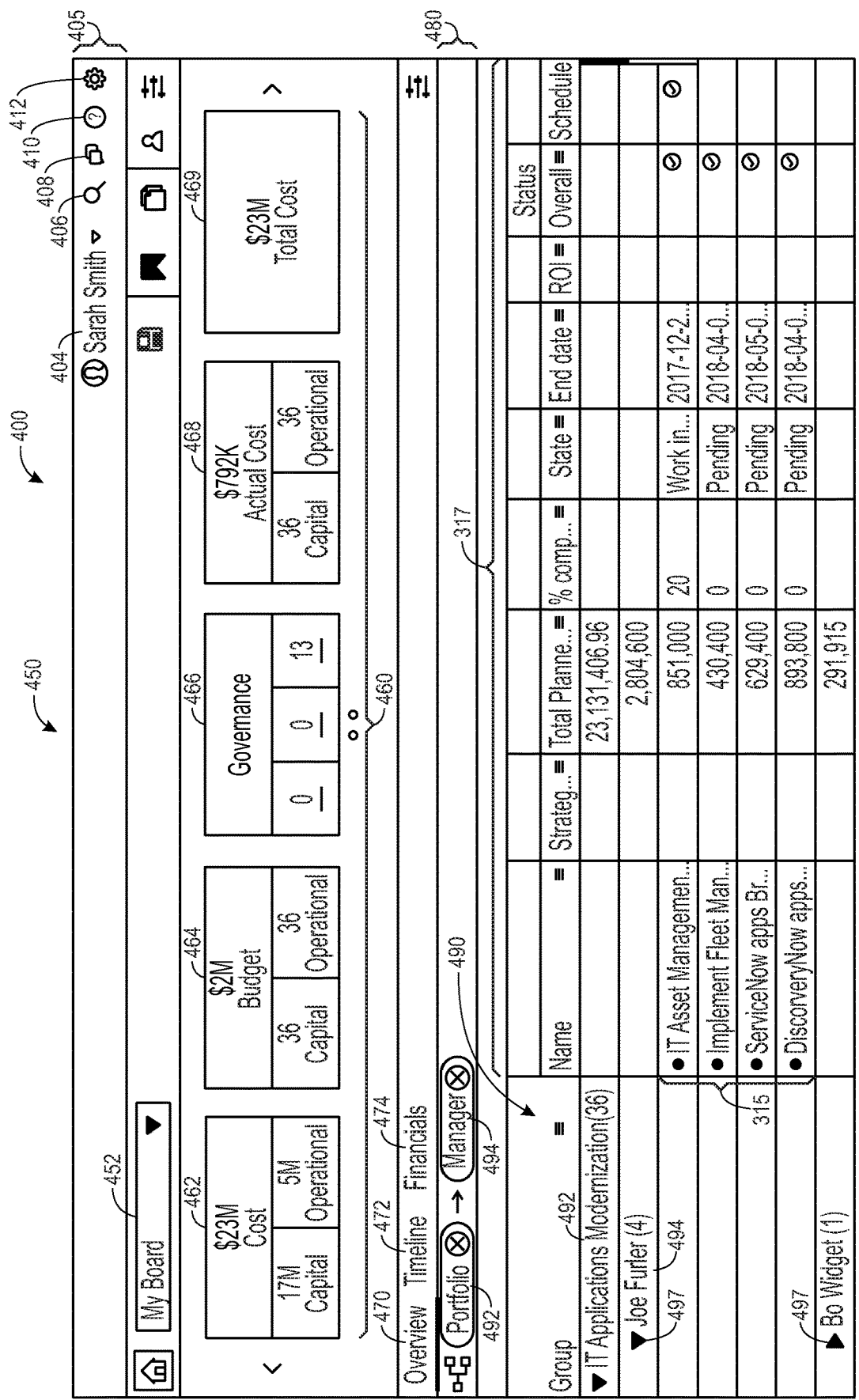
FIG. 11 is an embodiment of the customizable GUI of FIG. 6, enabling the grouping of the allocation objects based on a grouping configuration input, in accordance with aspects of the present approach.

FIG. 11 is an embodiment of the customizable GUI 400 of FIG. 6, enabling the grouping of the allocation objects 315 based on a grouping configuration input 480, in accordance with aspects of the present approach. In the illustrated embodiment, the grouping configuration input 480 includes "Portfolio" and "Manager" as the grouping criteria. "Portfolio" and "Manager" are displayed on the prompt for a grouping configuration input 480 to indicate that a grouped allocation request 490 is generated. Specifically, in the illustrated embodiment, the first cell 482 (of FIG. 10) and the second cell 484 (of FIG. 11) are dragged into the prompt for receiving the grouping configuration inputs 480. Although in the illustrated embodiment, the cells are dragged into the prompt for grouping configuration input 480, in some embodiments, the cells designated to specify the grouping configuration input 480 may be selected, typed into the prompt for grouping configuration input 480, etc. As discussed above, the first cell 482 specifies the "Portfolio" associated with the allocation object "IT Asset Management," namely, "IT Applications Modernization." The second cell 484 specified the "Manager" (e.g., attribute) associated with the allocation object "IT Asset Management," namely, "Joe Furler." After receipt of the first cell 482 and the second cell 484 as the grouping configuration inputs 480, the customizable GUI 400 may generate the grouped allocation request 490 in the detailed client instance view 450.

In the illustrated embodiment, the first cell 482 is first dragged to the prompt for receiving the grouping configuration inputs 480. As a result, the grouped allocation request 490 may show "IT Applications Modernization" as the first hierarchical attribute 492. Furthermore, the second cell 484 is second to be dragged to the prompt for receiving the grouping configuration inputs 480. As a result, the grouped allocation request 490 may show "Joe Furler" as the second hierarchical attribute 494. Furthermore, the grouped allocation request may include the attributes associated with the "Portfolio" (e.g., the first cell 482) for "IT Applications Modernization" that includes "Joe Furler" as the "Manager" (e.g., the second cell 484). In some embodiments, the allocation items 311 satisfying the grouping configuration inputs 480 are generated as allocation objects 315. For example, in the illustrated embodiment, the allocation objects 315 and their associated attributes 317 (e.g., name, strategies, total planned budget, % completion, state, end date, etc.) satisfying the grouped allocation request 490 are generated.

In some embodiments, the first hierarchical attribute 492 may specify an attribute 317 the allocation objects 315 of the grouped allocation request 490 must include. For example, the grouped allocation request 490 may include all of the allocation objects 315 associated with "IT Application Modernization" as the "Portfolio" attribute, as specified by the first hierarchical attribute 492 of the grouping configuration inputs 480. The second hierarchical attribute 494 may specify another attribute 315 that the allocation objects satisfying the first hierarchical attribute 492 must also satisfy. For example, the grouped allocation request 490 may include all the allocation objects specified by the first hierarchical attribute 492, and the allocation objects 315 associated with "Joe Furler" as the "Manager."

Furthermore, in some embodiments, the customizable GUI 400 enables for the filtering of data, for example, via the selection of selectable arrows 497. That is, by selecting the selectable arrow 497 certain allocation objects 315 may be hidden or shown. For example, in the illustrated embodiment, when the selectable arrow 497 corresponding to a respective manager (here "Joe Furler") is selected, the four allocation objects satisfying the second hierarchical attribute 494 may be hidden. Alternatively, if the selectable arrow 497 corresponding to the respective manager is selected again, the hidden allocation objects may be shown. In some embodiments, the grouped allocation request 490 may be modified by removing certain attributes from the grouping configuration inputs 480 or dragging certain cells into the prompt for receiving grouping configuration inputs 480.

Figure 12:
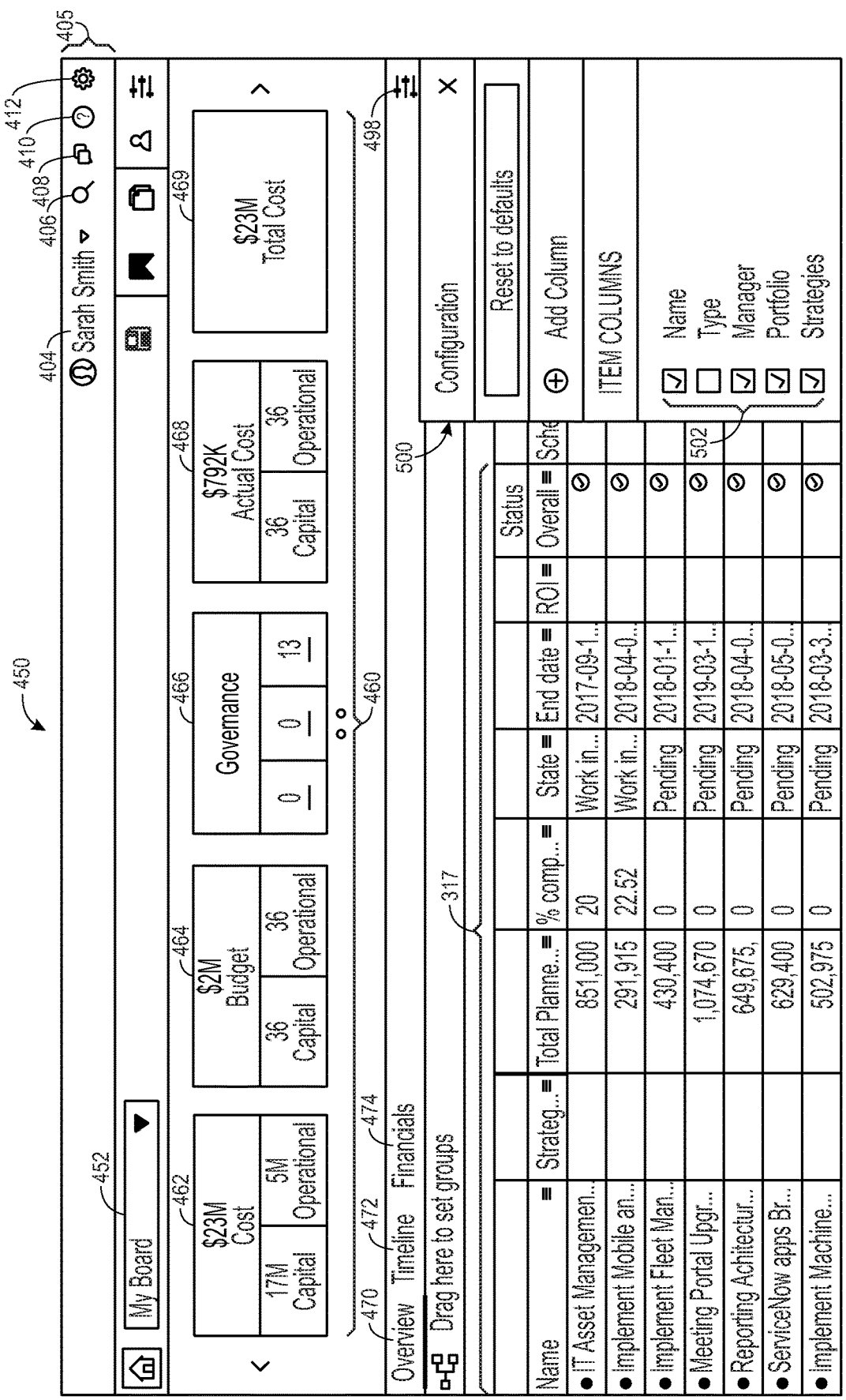
FIG. 12 is an embodiment of the customizable GUI of FIG. 6, enabling customization of attributes, in accordance with aspects of the present approach.

FIG. 12 is an embodiment of the customizable GUI 400 of FIG. 6, enabling customization of attributes 317, in accordance with aspects of the present approach. In the illustrated embodiment, the detailed client instance view 450 includes a selectable customization prompt 498. When the customization prompt 498 is selected a drop-down window 500 is generated, such that the attributes 317 presented on the detailed client instance view 450 may be customized. In some embodiments, the drop-down window 500 may serve as a filtering criteria. For example, the drop-down window 500 includes a selectable box 502 corresponding to each attribute 317. When the selectable boxes 502 corresponding to those attributes 317 are selected, those attributes may be generated as columns on the customizable GUI 400 in the detailed client instance view 450. For example, in the illustrated embodiment, the selectable boxes 502 corresponding to "Name," "Manager," "Portfolio," and "Strategies" are selected, and the selectable box 502 corresponding to "Type" is unselected. As such, in the detailed client instance view 450, the "Name," "Manager," "Portfolio," and "Strategies" are presented as columns for the attributes 317, while the "Type" is not presented as a column for the attributes 317.

In some embodiment, the drop-down window 500 may enable the creation of a new attribute that is not a default attribute 317 selectable via the present selectable boxes 502. For example, the drop-down window 500 may receive a user input to generate a new attribute 317, such that the new attribute may be propagated on the drop-down window 500 and include a corresponding selectable box 502, that when selected results in the new attribute being generated on the detailed client instance view 450.

Figure 13:
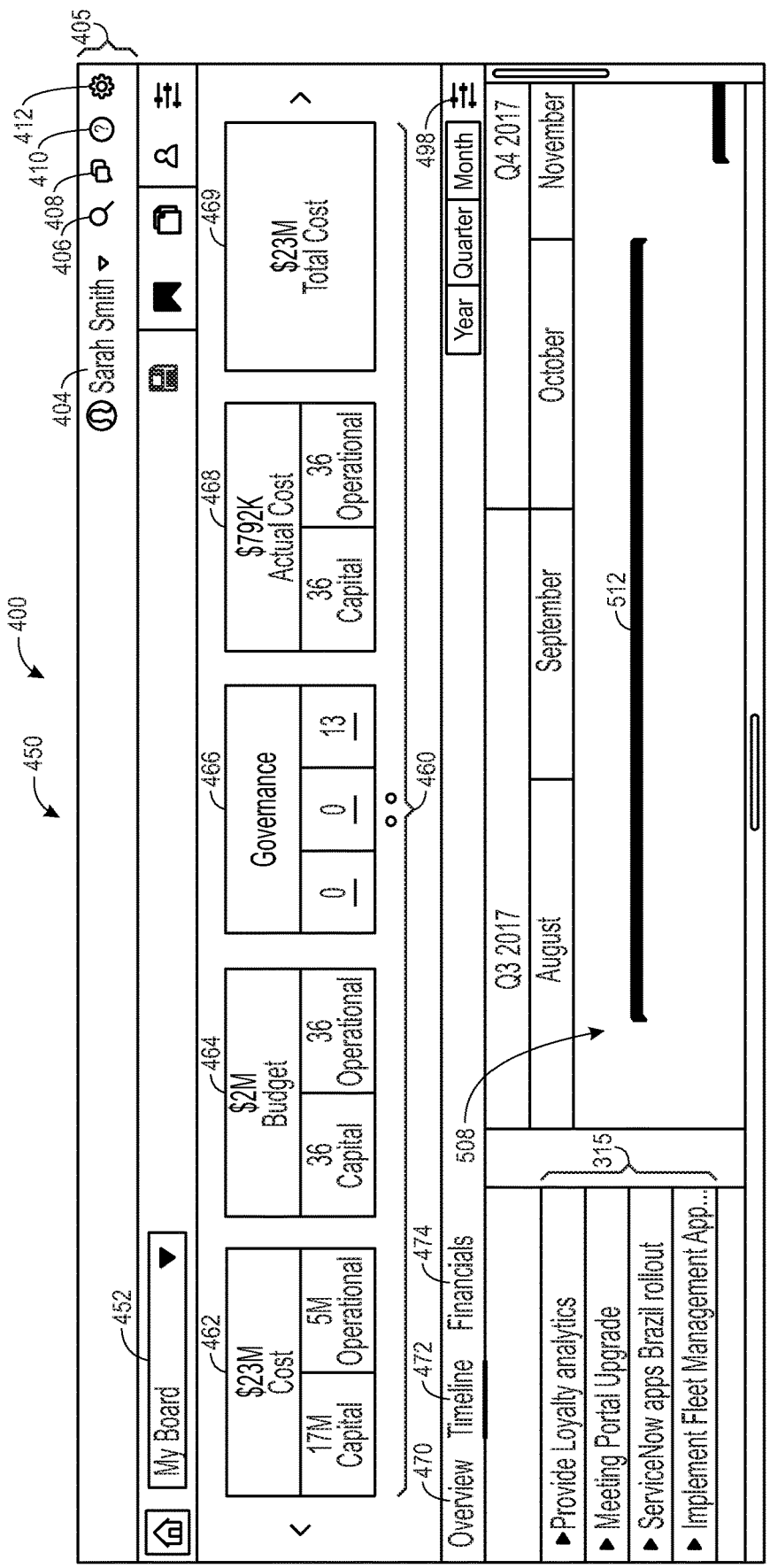
FIG. 13 is an embodiment of the customizable GUI of FIG. 6, depicting an timeline of the group of allocation objects of FIG. 10 in a detailed client instance view, in accordance with aspects of the present approach.

FIG. 13 is an embodiment of the customizable GUI of FIG. 6, depicting a timeline 508 of the group of allocation objects of FIG. 10 in the detailed client instance view 450, in accordance with aspects of the present approach. As mentioned above, the customizable GUI 400 includes a timeline tab 472. In the illustrated embodiment, the timeline tab 472 is selected, such that allocation objects 315 corresponding to certain allocation items 311 are presented as rows in the detailed client instance view 450. The timeline tab 472, when selected, also results in the customizable GUI 400 presenting a timeline 508 corresponding to the allocation objects. In some embodiments, the timelines 508 may be normalized, such that the timelines 508 are all presented on the detailed client instance view 450. In some embodiments, the timelines 508 may be organized into years, annual quarters, months, days, and the like. The customizable GUI 400 enable for the timelines 508 to be organized in any suitable manner. To help illustrate, in the illustrated embodiment, a timeline 508 is presented for each of a variety allocation objects 315. For example, in the illustrated embodiment, the allocation object 315 (e.g., corresponding to the allocation item 311 titled) "Meeting Portal Upgrade"

includes a first timeline 512 indicating that the time span for completing the allocation object 315 start is August 2017 and ends in October 2017. The timeline tab 472 is meant to provide a brief overview of the timeline 508 for completing the allocation objects 315 associated with the "My Board" group 452.

Figure 14:
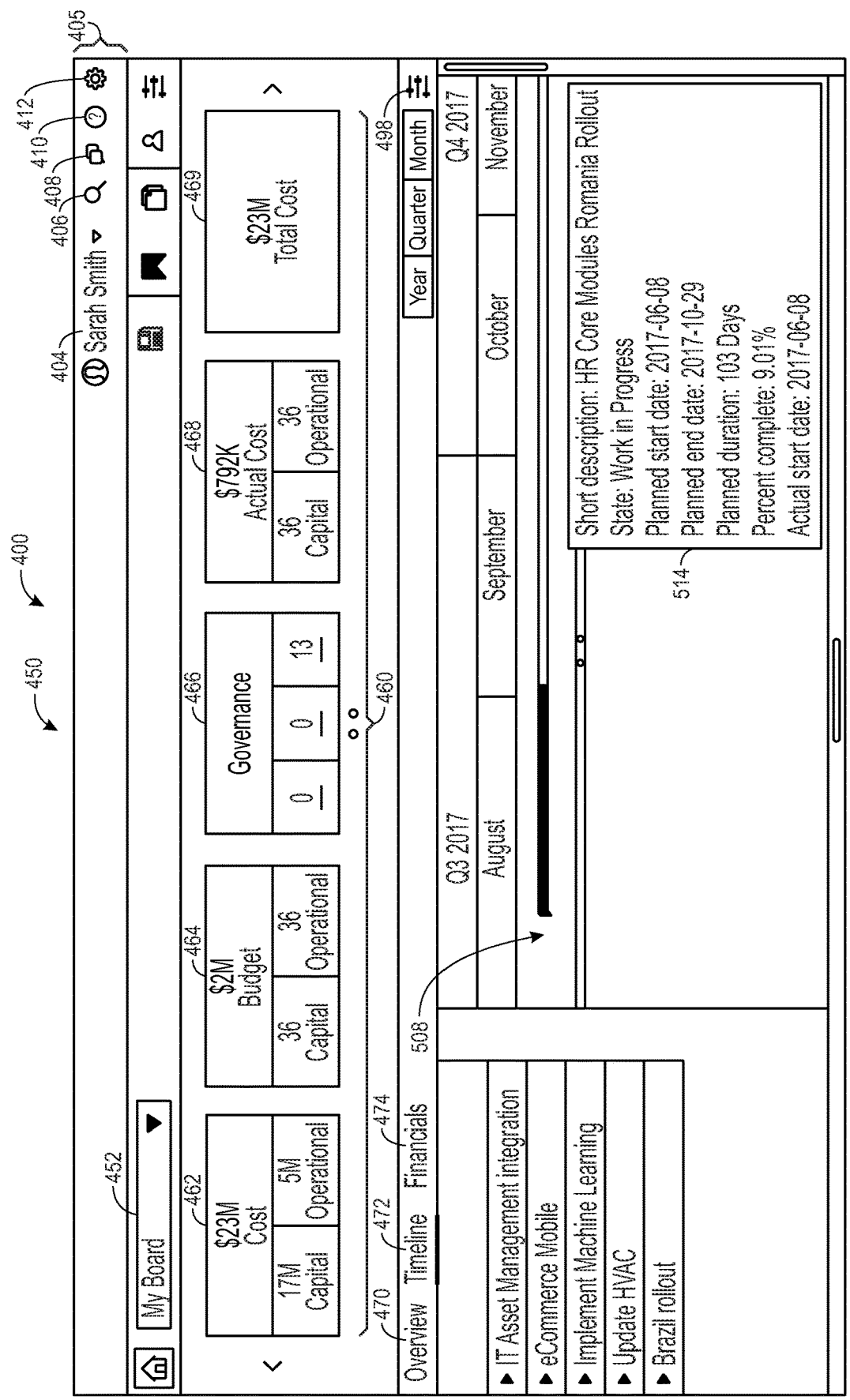
FIG. 14 is an embodiment of the customizable GUI of FIG. 6, depicting the timeline of FIG. 13 and detailed timeline information, in accordance with aspects of the present approach.

FIG. 14 is an embodiment of the customizable GUI 400 of FIG. 6, depicting the timelines 508 of FIG. 13 and timeline data 514, in accordance with aspects of the present approach. In some embodiments, the customizable GUI 400 may generate timeline data 514 in response to the cursor hovering over the timeline 508. When the cursor is positioned over a timeline for a certain amount of time (e.g., one second), the corresponding timeline data may be generated. For example, in the illustrated embodiment, the timeline 508 corresponding to the "eCommerce Mobile" allocation object 315 receives the cursor and generates timeline data 514 associated with the "eCommerce Mobile" allocation object 315. The timeline data 514 may include a short description, the state, the planned start date, the planned end date, the planned duration, the percent complete, and the actual start date, among other information associated with the allocation object 315. In addition or alternatively, the timeline data 514 may include the attributes 317. As such, customizing the attributes 317, as described above, may customize the timeline data 514. While in the illustrated embodiment, the timeline data 514 is generated by hovering the cursor over the timeline, in some embodiments, the timeline data 514 may be generated in response to any suitable user input, such as clicking the timeline, highlighting the timeline, just to name a few.

Figure 15:
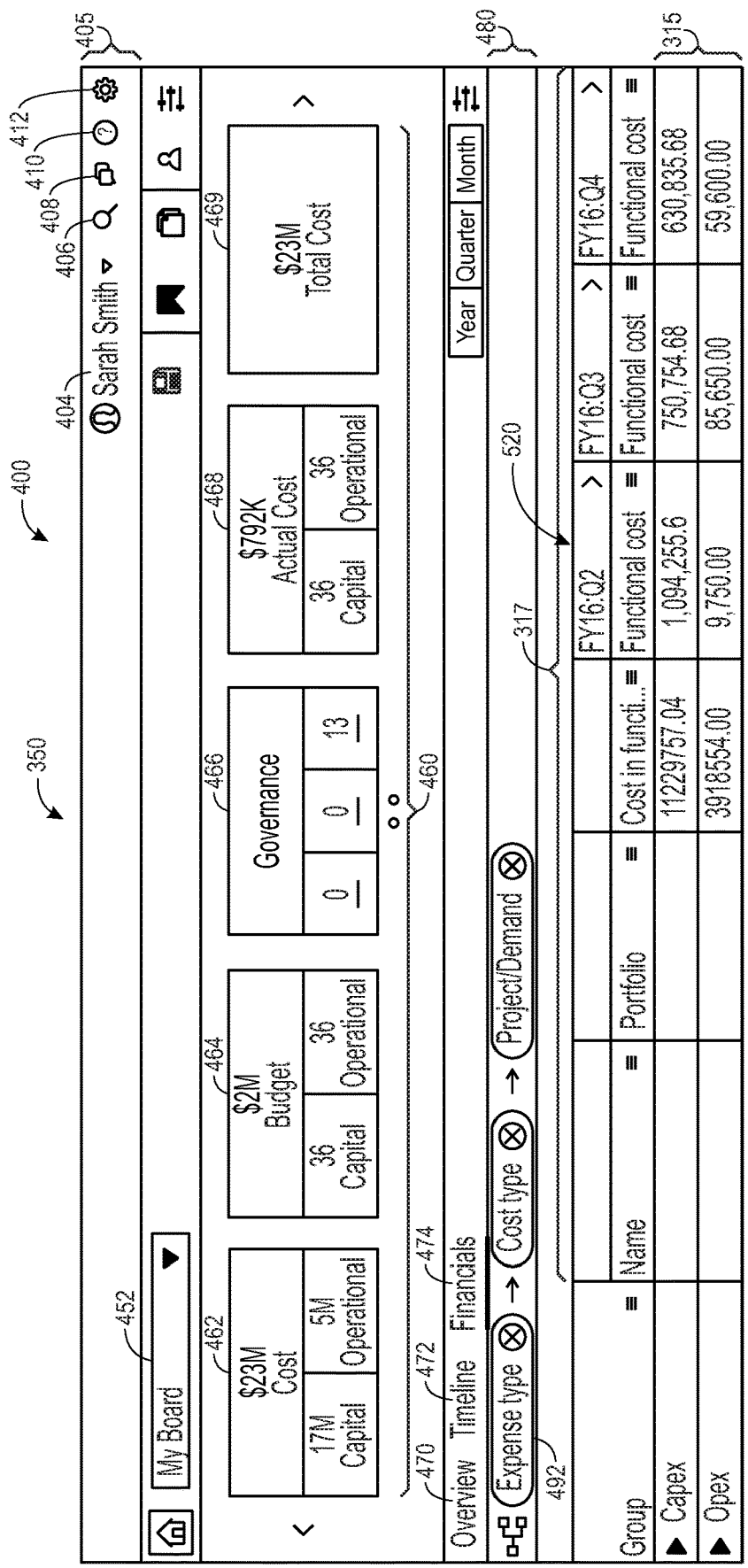
FIG. 15 is an embodiment of the customizable GUI of FIG. 6, depicting financial data of the group of allocation items of FIG. 10 in a detailed client instance view, in accordance with aspects of the present approach.

FIG. 15 is an embodiment of the customizable GUI 400 of FIG. 6, depicting financial data 520 of a group 418 of allocation items 311 in a detailed client instance view 450, in accordance with aspects of the present approach. In the illustrated embodiment, the financials tab 474 is selected, such that the customizable GUI 400 present financial data 520. In some embodiments, selection of the financials tab 474 may cause the customizable GUI 400 to present the allocation objects 315 associated with expenditures or revenue. As such, selection of the financials tab 474 may result in presentation of a filtered set of allocation objects 315 (e.g., related to expenditures or revenue) or attributes 317 (e.g., related to expenditures or revenue). In some embodiments, the financial data 520 may include attributes 317, such as the functional cost, the actual cost, and other financial data, associated each of the allocation objects 315.

In some embodiments, when the financials tab 474 is selected, the customizable GUI 400 includes the prompt for receiving grouping configuration inputs 480. In the illustrated embodiment, certain cells for specifying the grouping criteria of the attributes 317 have been dragged to the prompt for receiving grouping configuration inputs 480 to group the financial data 520 based on an "Expense type," "Cost type," and "Project/Demand." In the illustrated embodiment, the grouped allocation request 490 includes the allocation objects 315 (e.g., "Capex" and "Opex"), satisfying the grouping configuration inputs 480, as described above. The presented financial data 520 may be filtered, as described above in FIG. 11.

Figure 16:
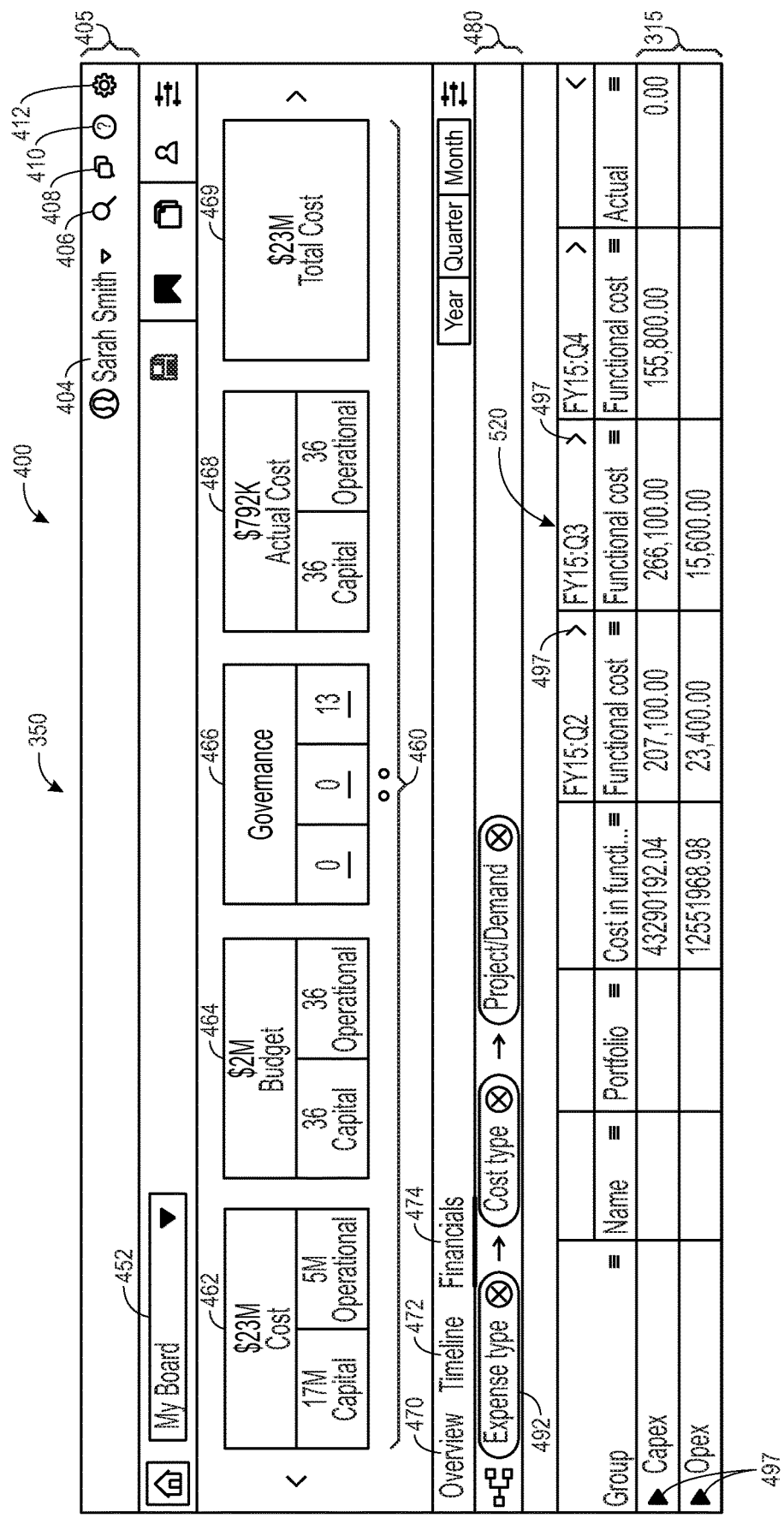
FIG. 16 is an embodiment of the customizable GUI of FIG. 6, enabling the expansion of the financial data of FIG. 15, in accordance with aspects of the present approach.

FIG. 16 is an embodiment of the customizable GUI 400 of FIG. 6, enabling the expansion of the financial data 520 of FIG. 15, in accordance with aspects of the present approach. After the financials tab 474 has been selected, the customizable GUI 400 may enable for the expansion of the financial data 520. In some embodiments, the columns and rows may include a selectable arrow 497, which, when selected, causes additional financial data 520 to be generated. For example, for the fourth quarter of the 2015 fiscal year (i.e., FY15:Q4), the corresponding selectable arrow 497 has been selected to present additional financial data 520. In this example, selecting the selectable arrow 497 causes the FY15:Q4 to also include additional attributes 317 (e.g., "Actual). It should be noted that any of the allocation objects 315, attributes 317, and the like, may be expandable.

Figure 17:
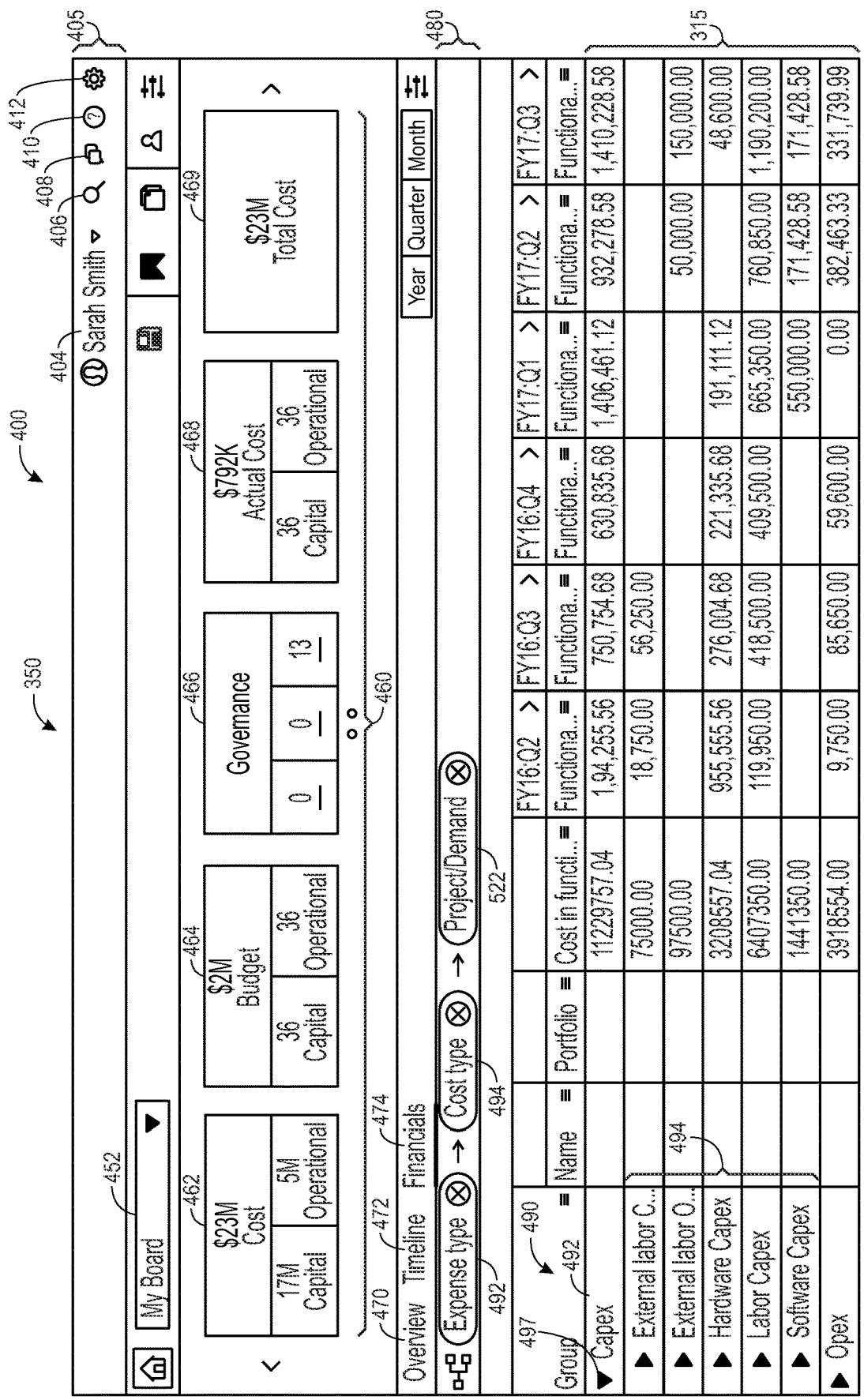
FIG. 17 is an embodiment of the customizable GUI of FIG. 6, enabling the expansion of the grouped allocation request, in accordance with aspects of the present approach.

FIG. 17 is an embodiment of the customizable GUI 400 of FIG. 6, enabling the expansion of the grouped allocation request 490, in accordance with aspects of the present approach. In the illustrated embodiment, the selectable arrow 497 corresponding to the attribute "Capex" has been selected. After selection of the corresponding selectable arrow 497, the customizable GUI 400 expands the first hierarchical attribute 494 (e.g., Capex) to show second hierarchical attributes 496 (e.g., "External labor capital expenses, External labor operational expenses, Hardware Capex, Labor Capex, Software Capex, etc.). In some embodiments, selection of the selectable arrow 497 corresponding to one of the second hierarchical attributes 496 may show third hierarchical attribute 522, as described with regard to FIG. 18. In the illustrated embodiment, the first hierarchical attribute 492 is indicative of an "Expense Type" as the grouping configuration input 480, the second hierarchical attribute 494 is indicative of a "Cost Type" as the grouping configuration input 480, and the third hierarchical attribute 522 is indicative of "Project/Demand." As mentioned above, the hierarchical attributes may be specified by dragging cells into the prompt for receiving grouping configuration inputs 480.

Figure 18:
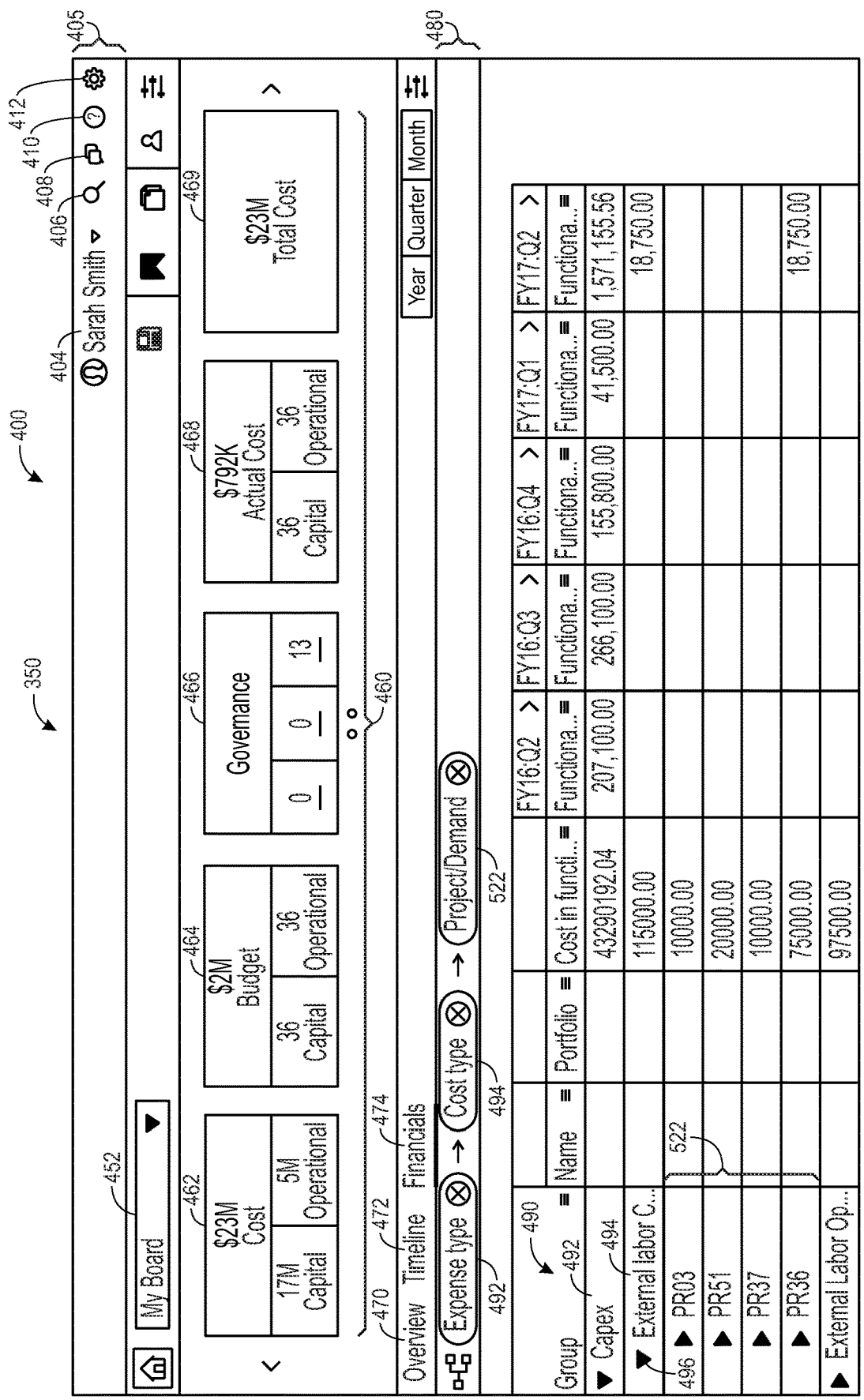
FIG. 18 is an embodiment of the customizable GUI of FIG. 6, enabling the further expansion of the grouped allocation request, in accordance with aspects of the present approach.

FIG. 18 is an embodiment of the customizable GUI 400 of FIG. 6, enabling the further expansion of the grouped allocation request 490, in accordance with aspects of the present approach. In transitioning from the embodiment of FIG. 17 to the embodiment of FIG. 18, the selectable arrow 497 corresponding "External Labor Capex" is selected to show additional attributes (e.g., PR03, PR51, PR37, PR36) satisfying the third hierarchical attribute 522. As such, the selectable arrows 497 may enable the filtering of the grouping allocation request 490.

Figure 19:
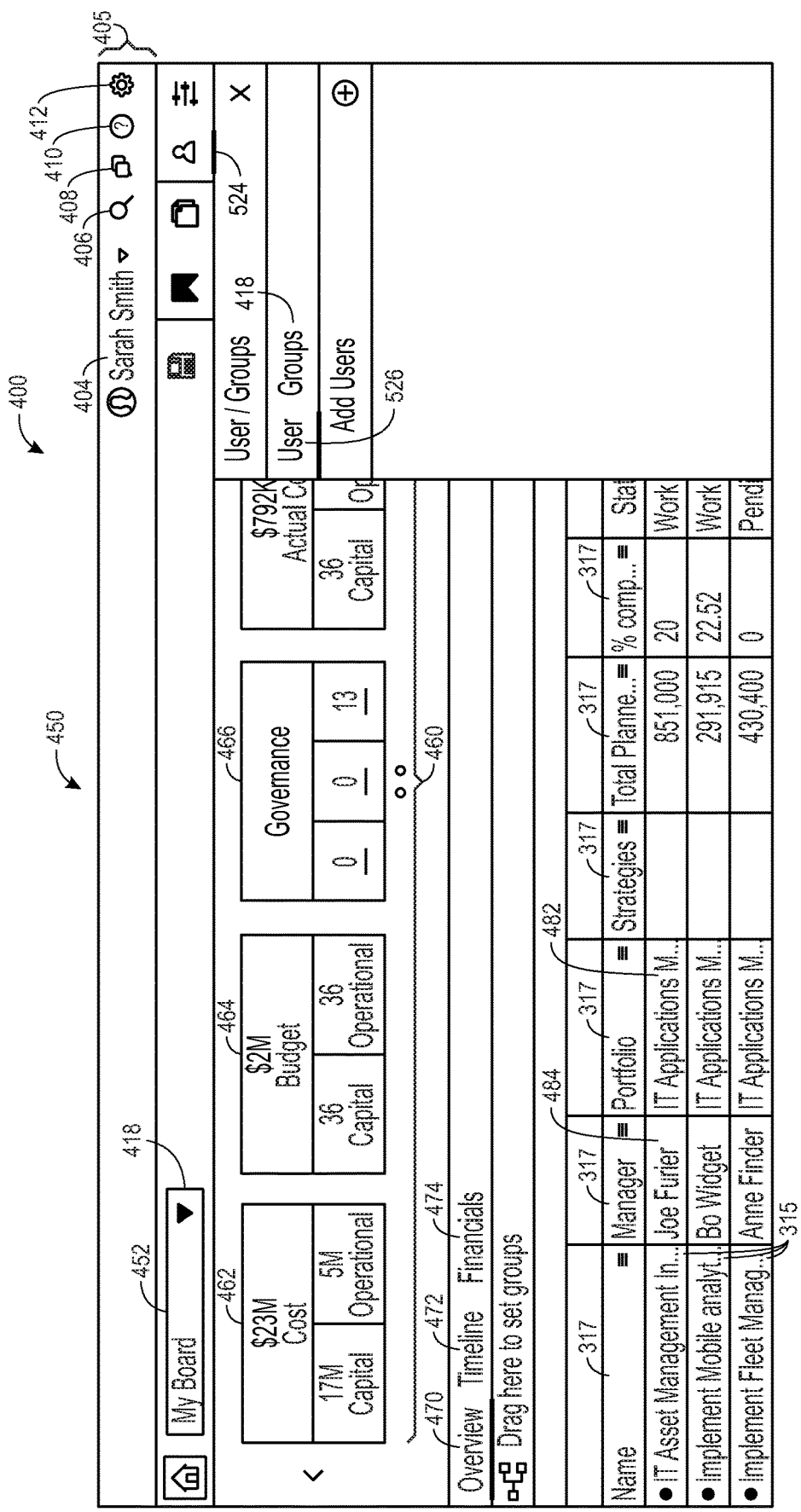
FIG. 19 is an embodiment of the customizable GUI of FIG. 6, enabling the sharing of the group of allocation items of FIG. 10, in accordance with aspects of the present approach.

FIG. 19 is an embodiment of the customizable GUI 400 of FIG. 6, enabling the sharing of the group of allocation items of FIG. 10, in accordance with aspects of the present approach. In the illustrated embodiment, the customizable GUI 400 includes share prompt 524, that when selected, enables the group 418 (e.g., "My Board" 452) to be shared with certain users 526 and/or groups 418. For example, in the illustrated embodiment, the customizable GUI 400 enables the users 526 or groups with which the "My Board" group 452 is shared with to be specified. In some embodiments, only the creator of the "My Board" group 452 may modify the "My Board" group 452, and the users 526 or groups with whom the "My Board" group 452 is shared with may view the content of the shared "My Board" group. In some embodiments, the functionality of operations able to be performed on the shared group may depend on an authority level of the individual with whom the shared group is shared with.

Figure 20:
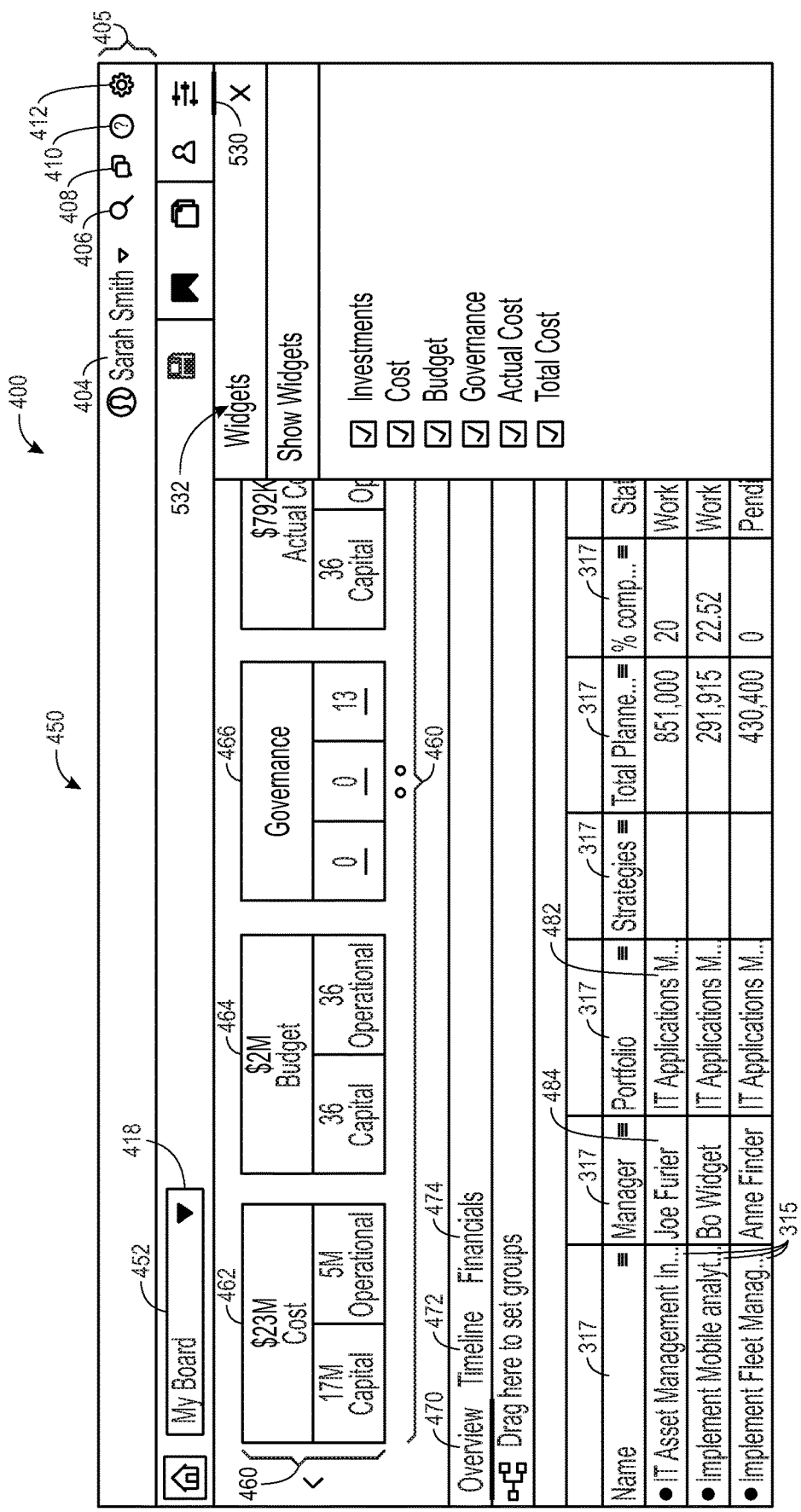
FIG. 20 is an embodiment of the customizable GUI of FIG. 6, enabling the modification of widgets, in accordance with aspects of the present approach.

FIG. 20 is an embodiment of the customizable GUI 400 of FIG. 6, enabling the modification of the widgets 460, in accordance with aspects of the present approach. In the illustrated embodiment, the customizable GUI 400 includes a selectable widget customization option 530, that when selected generates the pop-up side panel 532. The pop-up side panel 532 may include a list of widgets with corresponding checkbox for selecting widgets 460. In some embodiments, the widgets 460 with checks in their corresponding checkboxes may be generated in the detailed client instance view 450, as discussed above. Accordingly, the widgets 460 included in the detailed client instance view 450 may be customized to add or remove certain widgets. In some instances, it may be desirable to add new widgets to the list of widgets of the pop-up side panel 532. In some instances, the customizable GUI 400 may enable for the addition of more widgets to the list of widgets of the pop-up side panel 532.

Figure 21:
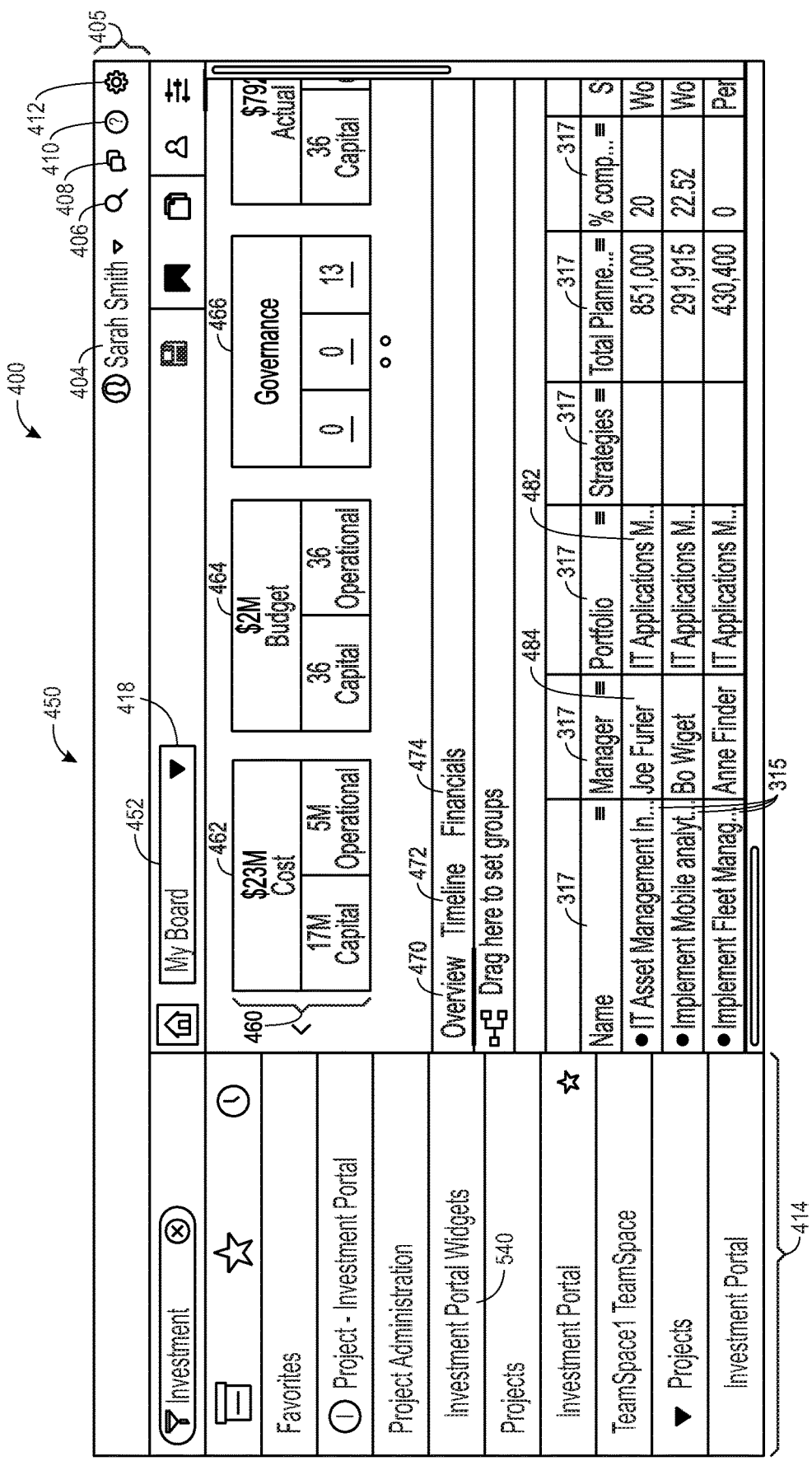
FIG. 21 is an embodiment of the customizable GUI of FIG. 6, enabling the creation of widgets via a side navigation panel, in accordance with aspects of the present approach.

FIG. 21 is an embodiment of the customizable GUI 400 of FIG. 6, enabling the creation of widgets 460 via the side navigation panel 414, in accordance with aspects of the present approach. In the illustrated embodiment, the side navigation panel 414 may be expanded to enable the selection of various features. For example, in response to selection of a first side navigation panel option 540 (e.g., "Investment Portal Widgets," the customizable GUI may enable the creation of additional widgets 460. In some embodiments, selection of the first side navigation panel option 540 may enable the selection of already generated widgets 460, the creation of new widgets, and the like.

Figure 22:
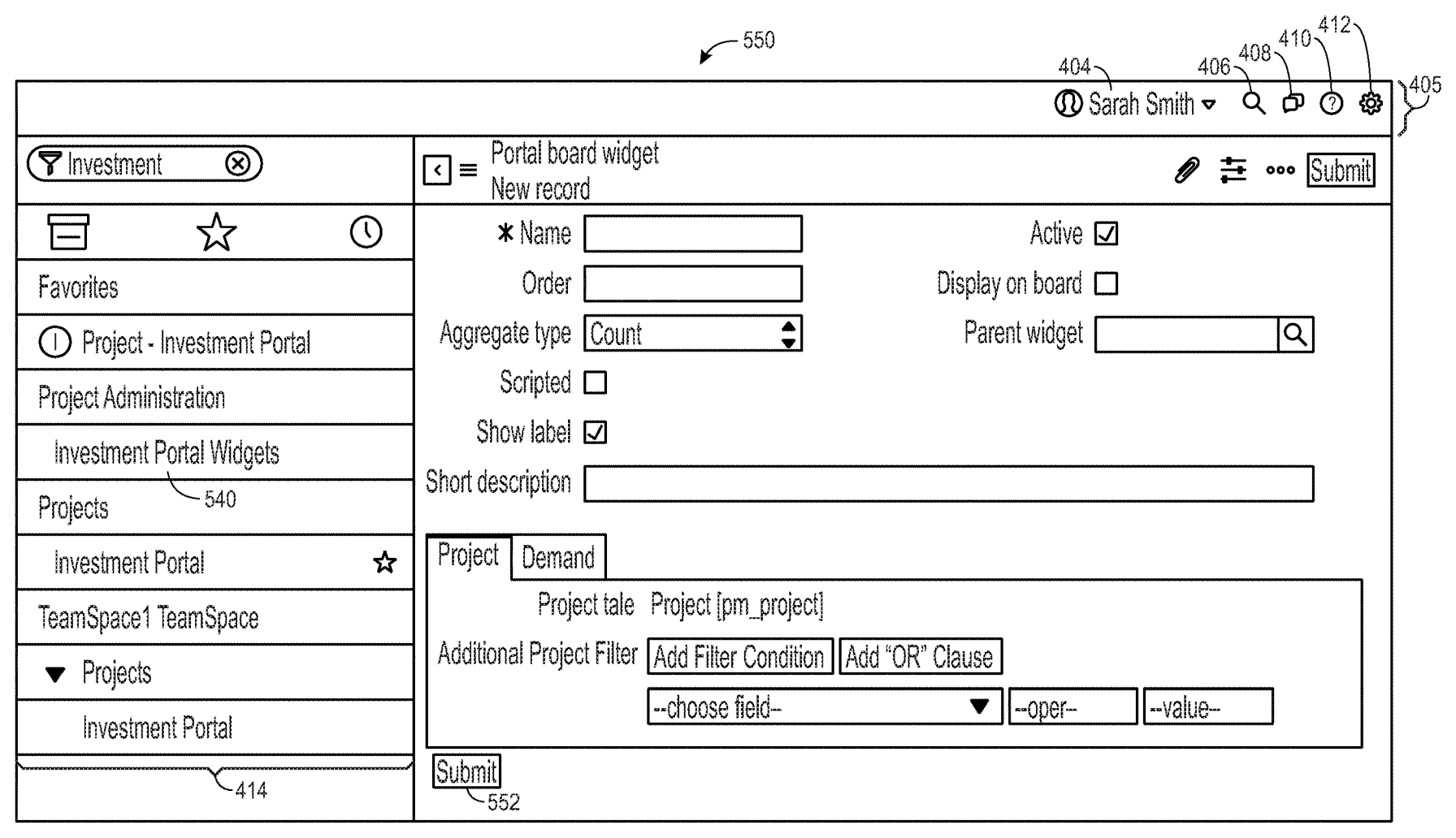

FIG. 22 is an embodiment of the customizable GUI 400 of FIG. 6, enabling the customization of the created widgets of FIG. 21, in accordance with aspects of the present approach. In the illustrated embodiment, after selection of the first navigation panel option 540, the widget customization window 550 may be generated. The widget customization window 550 includes various text boxes for specifying various aspects of the newly created widget. For example, the customization window 550 includes textboxes or selectable options for specifying a name, order, aggregate type, a short description, and Boolean logic conditions for when to include the newly created widget in the detailed client instance view 450, and the like. After the text boxes or selectable options have been customized, selection of the submit option 552 may cause the newly created widget 460 to be added to pop-up side panel 532 of FIG. 20.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A cloud computing system configured to manage a plurality of resources of one or more enterprise networks, the cloud computing system comprising:
    a data server configured to store data and to allow access to the data over a client instance; and
    an application server communicatively coupled to the data server, the application server comprising one more non-transitory memories storing instructions and one or more hardware processors configured to perform actions on the data and to execute the instructions to cause the one or more hardware processors to perform one or more operations comprising:
        identifying a plurality of objects associated with the one or more enterprise networks and stored within the data server;
        normalizing a first attribute of a first object from the plurality of objects and a second attribute of a second object of the plurality of objects on a graphical user interface (GUI) to compare the first normalized attribute and the second normalized attribute;
        determining the first object comprises an allocation request and the second object comprises an allocation project based at least on the comparison, wherein the allocation request has not been elevated to a status of the allocation project;
        filtering the first normalized attribute and the second normalized attribute based at least on one or more filter configuration inputs received via the GUI;
        aggregating the first normalized attribute and the second normalized attribute with other filtered attributes of the plurality of objects based at least on the one or more filter configuration inputs received via the GUI;
        grouping the allocation request and the allocation project based at least on one or more grouping configuration inputs received via the GUI to generate a grouping of the allocation request and the allocation project on the GUI;
        receiving data indicative of an allocation of one or more resources to the grouping, wherein the one or more resources comprise funds, labor, time, computation items, or any combination thereof; and
        allocating the one or more resources based on the data indicative of the allocation of the one or more resources.

2. The cloud computing system of claim 1, wherein normalizing the first and second attribute comprises normalizing the first object and the second object.

3. The cloud computing system of claim 1, wherein normalizing the first and second attribute comprises:
    arranging the first attribute and the second attribute on respective columns on the GUI; and
    arranging the first object and the second object on respective rows on the GUI, wherein an intersection of a column corresponding to the first attribute and a row corresponding to the first object comprises a first cell indicative of the first attribute of the first object.

4. The cloud computing system of claim 3, wherein the one or more operations comprise rearranging the first object and the second objects into new respective rows on the GUI based on the one or more grouping configuration inputs, the one or more filter configuration inputs, or any combination thereof.

5. The cloud computing system of claim 1, wherein the allocation request comprises a planned task for allocating the a first subset of the one or more resources to an enterprise unit associated with the one or more enterprise networks, and wherein the allocation project comprises a presently executed task associated with another enterprise unit, and wherein the allocation project is funded with a second subset of the one or more resources.

6. The cloud computing system of claim 1, wherein the first attribute and the second attribute each comprise: an enterprise unit attribute, an executive sponsor program attribute, a resource usage attribute, an applications attribute, a strategy attribute, a capital expense attribute, an operating expense attribute, or any combination thereof.

7. The cloud computing system of claim 1 wherein each object of the plurality of objects are associated with one allocation project of a plurality of allocation projects or one allocation request of a plurality of allocation requests.

8. The cloud computing system of claim 1, wherein the one or more grouping configuration inputs comprise one or more attributes that the grouping must include.

9. The cloud computing system of claim 1, wherein grouping the allocation request and the allocation project comprises arranging the allocation request and the allocation project into a hierarchical arrangement based on an order in which the one or more grouping configuration inputs are received.

10. The cloud computing system of claim 1, wherein the GUI is accessible via the client instance.

11. A processor-implemented method, comprising:
identifying, via one or more hardware processors, a plurality of objects associated with one or more enterprise networks and stored within a data server communicatively coupled to the one or more hardware processors;
normalizing, via the one or more hardware processors, a first attribute of a first object from the plurality of objects and a second attribute of a second object of the plurality of objects on a graphical user interface (GUI) to compare the first normalized attribute and the second normalized attribute;
determining, via the one or more hardware processors, the first object comprises an allocation request and the second object comprises an allocation project based at least on the comparison, wherein the allocation request has not been elevated to a status of the allocation project;
filtering, via the one or more hardware processors, the first normalized attribute and the second normalized attribute based at least on one or more filter configuration inputs received via the GUI;
aggregating, via the one or more hardware processors, the first normalized attribute and the second normalized attribute with other filtered attributes of the plurality of objects based at least on the one or more filter configuration inputs received via the GUI;
grouping, via the one or more hardware processors, the allocation request and the allocation project based at least on one or more grouping configuration inputs received via the GUI to generate a grouping of the allocation request and the allocation project on the GUI;
receiving data indicative of an allocation of one or more resources to the grouping, wherein the one or more resources comprise funds, labor, time, computation items, or any combination thereof; and
allocating the one or more resources based on the data indicative of the allocation of the one or more resources.

12. The processor-implemented method of claim 11, further comprising:
compiling, via the one or more hardware processors, a plurality of widgets associated with the one or more enterprise networks on the GUI.

13. The processor-implemented method of claim 11, wherein normalizing the first attribute and the second attribute comprises presenting the first object and the second object with a common font, a common font size, on a common axis, or any combination thereof, on the GUI.

14. The processor-implemented method of claim 11, wherein normalizing the first and second attribute comprises:
arranging the first attribute and the second attribute on respective columns on the GUI; and
arranging the first object and the second object on respective rows on the GUI, wherein an intersection of a column corresponding to the first attribute and a row corresponding to the first object comprises a first cell indicative of the first attribute of the first object.

15. The processor-implemented method of claim 14, wherein generating the grouping comprises:
rearranging the first attribute and the second attribute on new respective columns on the GUI based on the one or more grouping configuration inputs and the one or more filter configuration inputs; and
rearranging the first object and the second object on new respective rows on the GUI based on the one or more grouping configuration inputs and the one or more filter configuration inputs.

16. The processor-implemented method of claim 11, wherein filtering the first normalized attribute and the second normalized attribute comprises showing or hiding a respective feature of the first normalized attribute and the second normalized attribute.

17. A processor having access to a client instance and configured to execute instructions stored on one or more memory devices, wherein executing the instructions causes the processor to perform operations over the client instance, wherein the operations comprise:
normalizing a first attribute of a first object from a plurality of objects and a second attribute of a second object of the plurality of objects on a graphical user interface (GUI) to compare the first normalized attribute and the second normalized attribute, wherein the first object comprises an allocation request and the second object comprises an allocation project based at least on the comparison, wherein the allocation request has not been elevated to a status of the allocation project;
filtering the first normalized attribute and the second normalized attribute based at least on one or more filter configuration inputs received via the GUI;
aggregating the first normalized attribute and the second normalized attribute with other filtered attributes of the plurality of objects based at least on the one or more filter configuration inputs received via the GUI;
grouping the allocation request and the allocation project based at least on one or more grouping configuration inputs received via the GUI to generate a grouping of the allocation request and the allocation project on the GUI;
receiving data indicative of an allocation of one or more resources to the grouping, wherein the one or more resources comprise funds, labor, time, computation items, or any combination thereof; and
allocating the one or more resources based on the data indicative of the allocation of the one or more resources.

18. The processor of claim 17, wherein the operations comprise:
arranging the first attribute and the second attribute on respective columns on the GUI; and
arranging the first object and the second object on respective rows on the GUI, wherein an intersection of a column corresponding to the first attribute and a row corresponding to the first object comprises a first cell indicative of the first attribute of the first object.

19. The processor of claim 17, wherein the operations comprise:
compiling a plurality of widgets associated with one or more enterprise networks, wherein the plurality of widgets are viewable the GUI.

20. The processor of claim 19, wherein the plurality of widgets comprise:
a first widget indicative of a total cost of the grouped allocation request and the allocation project;
a second widget indicative of a total budget of the grouped allocation request and the allocation project;
a third widget indicative of a governance of the grouped allocation request and the allocation project;
a fourth widget indicative of a capital expense and an operational expense of the grouped allocation request and the allocation project;
a fifth widget indicative of the total cost of the grouped allocation request and the allocation project;
or any combination thereof.

* * * * *